(12) United States Patent
Wojcieszak et al.

(10) Patent No.: US 11,176,956 B2
(45) Date of Patent: Nov. 16, 2021

(54) APPLICATION DIRECTED LATENCY CONTROL FOR WIRELESS AUDIO STREAMING

(71) Applicant: QUALCOMM Incorporated, San Diego, CA (US)

(72) Inventors: Laurent Wojcieszak, Belfast (GB); John Oliver, Belfast (GB); Richard Turner, Belfast (GB); Gary Sands, Belfast (GB); Justin Hundt, Londonderry (GB)

(73) Assignee: Qualcomm Incorproated, San Diego, CA (US)

( * ) Notice: Subject to any disclaimer, the term of this patent is extended or adjusted under 35 U.S.C. 154(b) by 119 days.

(21) Appl. No.: 16/219,485

(22) Filed: Dec. 13, 2018

(65) Prior Publication Data

US 2019/0304477 A1 Oct. 3, 2019

Related U.S. Application Data

(60) Provisional application No. 62/649,213, filed on Mar. 28, 2018.

(51) Int. Cl.
*G10L 19/16* (2013.01)
*G10L 19/24* (2013.01)
(Continued)

(52) U.S. Cl.
CPC ......... *G10L 19/167* (2013.01); *G10H 1/0083* (2013.01); *G10L 19/24* (2013.01);
(Continued)

(58) Field of Classification Search
CPC .................. G10L 19/167; H04W 28/0268
See application file for complete search history.

(56) References Cited

U.S. PATENT DOCUMENTS 7,460,476 B1 * 12/2008 Morris .............. H04W 72/1242
370/230.1
8,989,173 B2 3/2015 Hubball et al.
(Continued)

FOREIGN PATENT DOCUMENTS

KR 20180026360 A 3/2018
WO 2018053159 A1 3/2018

OTHER PUBLICATIONS

Anonymous: "AAudio, Android Developers", accessed from https://developer.android.com/ndk/guides/audio/addudio.html on or about Mar. 2, 2018, 14 pages.
(Continued)

*Primary Examiner* — Shaun Roberts
(74) *Attorney, Agent, or Firm* — Espartaco Diaz Hidalgo

(57) ABSTRACT

In general, various aspects of techniques are described to enable application directed latency control for wireless audio streaming. A source device comprising a memory and a processor may perform the techniques. The memory may store at least a portion of audio data. The processor may execute an application that outputs the audio data, and a request for a quality of service concerning audio processing applied to the audio data. The processor may determine whether the source device is currently displaying the application, and configure, responsive to the determination that the source device is currently displaying the application, a wireless audio processing path to achieve the requested quality of service. The processor may next process, by the wireless audio processing path, the audio data to obtain a bitstream representative of the audio data.

33 Claims, 7 Drawing Sheets

(51) Int. Cl.
*H04R 3/00* (2006.01)
*H04W 28/02* (2009.01)
*G10H 1/00* (2006.01)

(52) U.S. Cl.
CPC .......... *H04R 3/00* (2013.01); *H04W 28/0268* (2013.01); *H04R 2420/07* (2013.01)

(56) References Cited

U.S. PATENT DOCUMENTS

| | | | | |
|---|---|---|---|---|
| 9,294,362 | B2* | 3/2016 | de Assuncao | H04L 41/50 |
| 9,859,858 | B2 | 1/2018 | Porter et al. | |
| 9,928,844 | B2* | 3/2018 | Lawrence | H04N 21/6336 |
| 2002/0075806 | A1* | 6/2002 | Shalvi | H04J 3/1682 |
| | | | | 370/235 |
| 2005/0233728 | A1* | 10/2005 | Karaoguz | H04W 24/02 |
| | | | | 455/406 |
| 2006/0230171 | A1* | 10/2006 | Dacosta | H04L 29/06027 |
| | | | | 709/231 |
| 2008/0039089 | A1* | 2/2008 | Berkman | H04W 36/04 |
| | | | | 455/436 |
| 2008/0091851 | A1* | 4/2008 | Sierra | G06F 3/16 |
| | | | | 710/22 |
| 2008/0147213 | A1* | 6/2008 | Omiya | G06F 3/162 |
| | | | | 700/94 |
| 2008/0247326 | A1* | 10/2008 | Cormier | H04W 12/0027 |
| | | | | 370/252 |
| 2010/0077243 | A1* | 3/2010 | Wang | G06F 1/3209 |
| | | | | 713/323 |
| 2010/0271944 | A1* | 10/2010 | Michaelis | H04L 65/80 |
| | | | | 370/230.1 |
| 2012/0002614 | A1* | 1/2012 | Ekici | H04W 28/24 |
| | | | | 370/329 |
| 2013/0215827 | A1* | 8/2013 | Nam | H04L 65/604 |
| | | | | 370/328 |
| 2015/0365999 | A1* | 12/2015 | Lee | H04W 4/80 |
| | | | | 381/315 |
| 2016/0014185 | A1* | 1/2016 | Lottermann | H04W 28/24 |
| | | | | 709/219 |
| 2016/0191181 | A1 | 6/2016 | Bailey | |
| 2016/0295579 | A1* | 10/2016 | Pham | H04W 72/085 |
| 2018/0014140 | A1 | 1/2018 | Milevski et al. | |
| 2018/0027033 | A1* | 1/2018 | Kamstrup | H04M 1/7253 |
| | | | | 370/310 |

OTHER PUBLICATIONS

Bluetooth SIG: "Bluetooth SIG Proprietary Bluetooth Core Specification v5.0", XP055499587, vol. 0, Dec. 6, 2016, 2822 Pages.
Bluetooth SIG: "Bluetooth Specification, Advanced audio distribution profile specification, A2DP v 1.3.1", Jul. 14, 2015, pp. 1-75.
Contributors to Audio Latency, Android Open Source Project, Retrieved from the Internet: https://source.android.com/devices/audio/latency/contrib accessed on or about Mar. 2, 2018, 5 pages.

* cited by examiner

APPLICATION DIRECTED LATENCY CONTROL FOR WIRELESS AUDIO STREAMING

This application claims the benefit of U.S. Provisional Application No. 62/649,213, filed Mar. 28, 2018, which is hereby incorporated by reference in its entirety.

TECHNICAL FIELD

This disclosure relates to streaming audio data and, more specifically, latency control for streaming audio data.

BACKGROUND

Wireless networks for short-range communication, which may be referred to as "personal area networks," are established to facilitate communication between a source device and a sink device. One example of a personal area network (PAN) protocol is Bluetooth®, which is often used to form a PAN for streaming audio data from the source device (e.g., a mobile phone) to the sink device (e.g., headphones or a speaker).

Although primarily used for streaming audio data, the Bluetooth® protocol is a general purpose PAN protocol that was intended to replace RS-232 wired data communication between the source device and the sink device. The general purpose nature of Bluetooth® has resulted in a fixed latency for communicating data of approximately 150 milliseconds (ms), which is suitable for most data communications.

The fixed latency of 150 ms is also a result of the Bluetooth® protocol operating within the 2.4 Gigahertz (GHz) spectrum that is also reserved for wireless local area networks (e.g., WiFi™). As such, there needs to be sufficient latency injected into the Bluetooth® session to allow for receipt and/or transmission of wireless local area network (WLAN) packets over the same 2.4 GHz spectrum. In this respect, the 150 ms of fixed Bluetooth® latency is a compromise that achieves adequate data communication between the source and sink devices for most purposes.

SUMMARY

In general, techniques are described by which to control latency for personal area network (PAN) communications between a source device and a sink device when streaming audio data. Rather than resort to a fixed latency, the techniques may allow for transitioning audio processing prior to delivery via a PAN session from a quality-focused processing path to a latency-focused processing path based on audio requirements specified by an application with which a user is currently interacting. The application with which the user is currently interacting may be referred to as an application-in-focus (or, in other words, an "app-in-focus").

In this respect, the techniques may allow a source device participating in a PAN session to adjust the existing PAN session to transition from low latency audio processing to high latency audio processing or from high latency audio processing to low latency audio processing. Rather than initiate a new PAN session configured to be either high latency audio processing or low latency audio processing, the techniques may dynamically adjust, responsive to the audio processing request of the app-in-focus, the existing PAN session by reconfiguring various QoS metrics.

In one aspect, the techniques are directed to a source device configured to stream audio data, the source device comprising: a memory configured to store at least a portion of the audio data; and one or more processors coupled to the memory, and configured to: execute an application that outputs the audio data, and a request for a quality of service concerning audio processing applied to the audio data; determine whether the source device is currently displaying the application; configure, responsive to the determination that the source device is currently displaying the application, a wireless audio processing path to achieve the requested quality of service; and processing, by the wireless audio processing path, the audio data to obtain a bitstream representative of the audio data.

In another aspect, the techniques are directed to a method of streaming audio data from a source device to a sink device, the method comprising: executing an application that outputs the audio data, and a request for a quality of service concerning audio processing applied to the audio data; determining whether the source device is currently displaying the application; configuring, responsive to the determination that the source device is currently displaying the application, a wireless audio processing path to achieve the requested quality of service; processing, by the wireless audio processing path, the audio data to obtain a bitstream representative of the audio data; and transmitting the bitstream to a sink device in accordance with a wireless communication protocol.

In another aspect, the techniques are directed to a source device configured to stream audio data to a sink device, the source device comprising: means for executing an application that outputs the audio data, and a request for a quality of service concerning audio processing applied to the audio data; means for determining whether the source device is currently displaying the application; means for configuring, responsive to the determination that the source device is currently displaying the application, wireless audio processing means to achieve the requested quality of service; the wireless audio processing means for processing the audio data to obtain a bitstream representative of the audio data; and means for transmitting the bitstream to a sink device in accordance with a wireless communication protocol.

In another aspect, the techniques are directed to a computer-readable medium having stored thereon instructions that, when executed, cause one or more processors of a source device to: execute an application that outputs the audio data, and a request for a quality of service concerning audio processing applied to the audio data; determine whether the source device is currently displaying the application; configure, responsive to the determination that the source device is currently displaying the application, a wireless audio processing path to achieve the requested quality of service; and process, using the wireless audio processing path, the audio data to obtain a bitstream representative of the audio data.

In another aspect, the techniques are directed to a sink device configured to process a bitstream representative of audio data received via a wireless connection, the sink device comprising: a memory configured to store at least a portion of the bitstream; and one or more processors coupled to the memory, and configured to: obtain an indication for a quality of service concerning audio processing applied to the audio data; configure a wireless audio processing path to achieve the indicated quality of service; process, using the wireless audio processing path, the bitstream to obtain the audio data; and output the audio data to one or more speakers. In another aspect, the techniques are directed to a method of processing a bitstream representative of audio data received via a wireless connection in accordance with a wireless communication protocol, the method comprising:

obtaining an indication for a quality of service concerning audio processing applied to the audio data; configuring a wireless audio processing path to achieve the indicated quality of service; processing, using the wireless audio processing path, the bitstream to obtain the audio data; and outputting the audio data to one or more speakers.

In another aspect, the techniques are directed to a sink device configured to process a bitstream representative of audio data received via a wireless connection in accordance with a wireless communication protocol, the sink device comprising: means for obtaining an indication for a quality of service concerning audio processing applied to the audio data; means for configuring wireless audio processing means to achieve the indicated quality of service; the wireless audio processing means for processing the bitstream to obtain the audio data; and means for outputting the audio data to one or more speakers.

In another aspect, the techniques are directed to a non-transitory computer-readable storage medium having stored thereon instructions that, when executed, cause one or more processors of a sink device to: obtain an indication for a quality of service concerning audio processing applied to audio data; configure a wireless audio processing path to achieve the indicated quality of service; process, using the wireless audio processing path, the bitstream to obtain the audio data; and output the audio data to one or more speakers.

In another aspect, the techniques are directed to a source device configured to stream audio data via a wireless connection to a sink device in accordance with a wireless communication protocol, the source device comprising: a memory configured to store at least a portion of the audio data; and one or more processors coupled to the memory, and configured to: obtain a plurality of compression ratios based on a bitrate of the wireless connection, the wireless connection allowing transmission of packets at regular intervals; select a compression ratio from the plurality of compression ratios that reduces latency associated with audio processing; configure, based on the selected compression ratio, a wireless audio processing path; and perform, by the wireless audio processing path, the audio processing with respect to the audio data to obtain a bitstream.

In another aspect, the techniques are directed to a method of streaming audio data via a wireless connection to a sink device in accordance with a wireless communication protocol, the method comprising: obtaining a plurality of compression ratios based on a bitrate of the wireless connection, the wireless connection allowing transmission of packets at regular intervals; selecting a compression ratio from the plurality of compression ratios that reduces latency associated with audio processing; configuring, based on the selected compression ratio, a wireless audio processing path; and performing, using the wireless audio processing path, the audio processing with respect to the audio data to obtain a bitstream.

In another aspect, the techniques are directed to a source device configured to stream audio data via a wireless connection to a sink device in accordance with a wireless communication protocol, the source device comprising: means for obtaining a plurality of compression ratios based on a bitrate of the wireless connection, the wireless connection allowing transmission of packets at regular intervals; means for selecting a compression ratio from the plurality of compression ratios that reduces latency associated with audio processing; means for configure, based on the selected compression ratio, wireless audio processing means; and the wireless audio processing means for performing the audio processing with respect to the audio data to obtain a bitstream.

In another aspect, the techniques are directed to a non-transitory computer-readable storage medium having stored thereon instructions that, when executed, cause one or more processors of a sink device to: obtain a plurality of compression ratios based on a bitrate of a wireless connection, the wireless connection allowing transmission of packets at regular intervals; select a compression ratio from the plurality of compression ratios that reduces latency associated with audio processing; configure, based on the selected compression ratio, a wireless audio processing path; and perform, using the wireless audio processing path, the audio processing with respect to audio data to obtain a bitstream.

The details of one or more aspects of the techniques are set forth in the accompanying drawings and the description below. Other features, objects, and advantages of these techniques will be apparent from the description and drawings, and from the claims.

DETAILED DESCRIPTION

Figure 1:
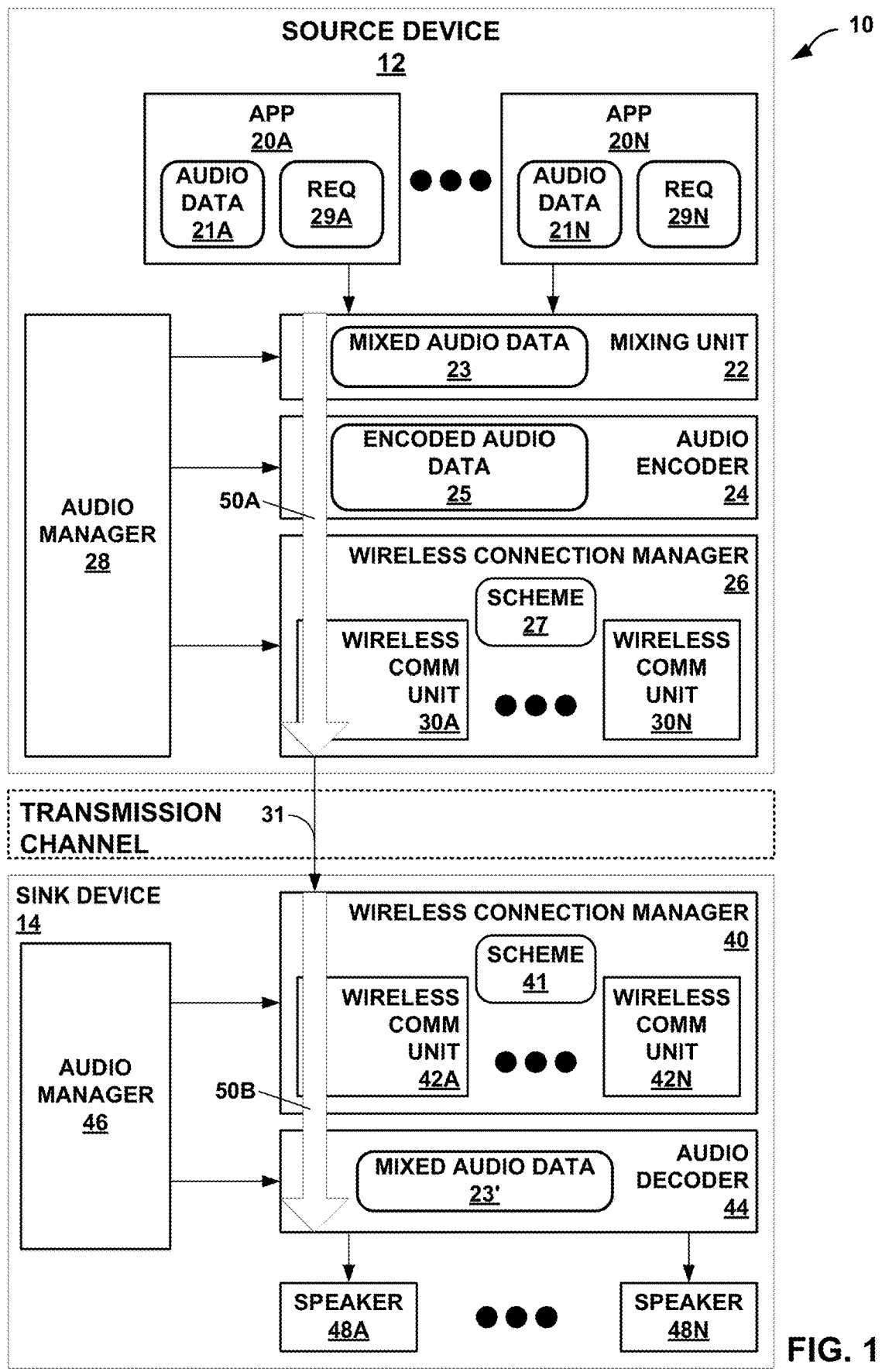
FIG. 1 is a diagram illustrating a system that may perform various aspects of the techniques described in this disclosure.

FIG. 1 is a diagram illustrating a system 10 that may perform various aspects of the techniques described in this disclosure. As shown in the example of FIG. 1, the system 10 includes a source device 12 and a sink device 14. Although described with respect to the source device 12 and the sink device 14, the source device 12 may operate, in some instances, as the sink device, and the sink device 14 may, in these and other instances, operate as the source device. As such, the example of system 10 shown in FIG. 1 is merely one example illustrative of various aspects of the techniques described in this disclosure.

In any event, the source device 12 may represent any form of computing device capable of implementing the techniques described in this disclosure, including a handset (or cellular phone), a tablet computer, a so-called smart phone, a remotely piloted aircraft (such as a so-called "drone"), a robot, a desktop computer, a receiver (such as an audio/visual—AV—receiver), a set-top box, a television (including so-called "smart televisions"), a media player (such as s digital video disc player, a streaming media player, a Blue-Ray Disc™ player, etc.), or any other device capable of communicating audio data wirelessly to a sink device via a personal area network (PAN). For purposes of illustration, the source device 12 is assumed to represent a smart phone in this example.

The sink device 14 may represent any form of computing device capable of implementing the techniques described in this disclosure, including a handset (or cellular phone), a tablet computer, a smart phone, a desktop computer, a wireless headset (which may include wireless headphones that include or exclude a microphone, and so-called smart wireless headphones that include additional functionality such as fitness monitoring, on-board music storage and/or playback, dedicated cellular capabilities, etc.), a wireless speaker (including a so-called "smart speaker"), a watch (including so-called "smart watches"), or any other device capable of reproducing a soundfield based on audio data communicated wirelessly via the PAN. Also, for purposes of illustration, the sink device 14 is assumed to represent wireless headphones.

As shown in the example of FIG. 1, the source device 12 includes one or more applications ("apps") 20A-20N ("apps 20"), a mixing unit 22, an audio encoder 24, a wireless connection manager 26, and an audio manager 28. Although not shown in the example of FIG. 1, the source device 12 may include a number of other elements that support operation of apps 20, including an operating system, various hardware and/or software interfaces (such as user interfaces, including graphical user interfaces), one or more processors, memory, storage devices, and the like.

Each of the apps 20 represents software (such as a collection of instructions stored to a non-transitory computer readable media) that configure the source device 10 to provide some functionality when executed by the one or more processors of the source device 12. Apps 20 may, to provide a few examples, provide messaging functionality (such as access to emails, text messaging, and/or video messaging), voice calling functionality, video conferencing functionality, calendar functionality, audio streaming functionality, direction functionality, mapping functionality, gaming functionality. Apps 20 may be first party applications designed and developed by the same company that designs and sells the operating system executed by the source device 20 (and often pre-installed on the source device 20) or third party applications accessible via a so-called "app store" or possibly pre-installed on the source device 20. Each of the apps 20, when executed, may output audio data 21A-21N ("audio data 21"), respectively.

The mixing unit 22 represent a unit configured to mix one or more of audio data 21A-21N ("audio data 21") output by the apps 20 (and other audio data output by the operating system—such as alerts or other tones, including keyboard press tones, ringtones, etc.) to generate mixed audio data 23. Audio mixing may refer to a process whereby multiple sounds (as set forth in the audio data 21) are combined into one or more channels. During mixing, the mixing unit 22 may also manipulate and/or enhance volume levels (which may also be referred to as "gain levels"), frequency content, panoramic position of the audio data 21. In the context of streaming the audio data 21 over a wireless PAN session, the mixing unit 22 may output the mixed audio data 23 to the audio encoder 24.

The audio encoder 24 may represent a unit configured to encode the mixed audio data 23 and thereby obtain encoded audio data 25. Referring for purposes of illustration to one example of the PAN protocols, Bluetooth® provides for a number of different types of audio codecs (which is a word resulting from combining the words "encoding" and "decoding"), and is extensible to include vendor specific audio codecs. The Advanced Audio Distribution Profile (A2DP) of Bluetooth® indicates that support for A2DP requires supporting a subband codec specified in A2DP. A2DP also supports codecs set forth in MPEG-1 Part 3 (MP2), MPEG-2 Part 3 (MP3), MPEG-2 Part 7 (advanced audio coding—AAC), MPEG-4 Part 3 (high efficiency-AAC—HE-AAC), and Adaptive Transform Acoustic Coding (ATRAC). Furthermore, as noted above, A2DP of Bluetooth® supports vendor specific codecs, such as aptX™ and various other versions of aptX (e.g., enhanced aptX—E-aptX, aptX live, and aptX high definition—aptX-HD).

AptX may refer to an audio encoding and decoding (which may be referred to generally as a "codec") scheme by which to compress and decompress audio data, and may therefore be referred to as an "aptX audio codec." AptX may improve the functionality of the source and sink devices themselves as compression results in data structures that organize data in a manner that reduces bandwidth (including over internal busses and memory pathways) and/or storage consumption. The techniques described in this disclosure may further improve bandwidth and/or storage consumption while considering latency and other aspects of the source and sink devices, thereby improving operation of the devices themselves in contrast to merely implementing a known process using devices.

The audio encoder 24 may operate consistent with one or more of any of the above listed audio codecs, as well as, audio codecs not listed above, but that operate to encode the mixed audio data 23 to obtain the encoded audio data 25. The audio encoder 24 may output the encoded audio data 25 to one of the wireless communication units 30 (e.g., the wireless communication unit 30A) managed by the wireless connection manager 26.

The wireless connection manager 26 may represent a unit configured to allocate bandwidth within certain frequencies of the available spectrum to the different ones of the wireless communication units 30. For example, the Bluetooth® communication protocols operate over within the 2.4 GHz range of the spectrum, which overlaps with the range of the spectrum used by various WLAN communication protocols. The wireless connection manager 26 may allocate some portion of the bandwidth during a given time to the Bluetooth® protocol and different portions of the bandwidth during a different time to the overlapping WLAN protocols. The allocation of bandwidth and other aspects of the communication protocols are defined by a scheme 27. The wireless connection manager 40 may expose various application programmer interfaces (APIs) by which to adjust the allocation of bandwidth and other aspects of the communication protocols so as to achieve a specified quality of service (QoS). That is, the wireless connection manager 40 may provide the API to adjust the scheme 27 by which to control operation of the wireless communication units 30 to achieve the specified QoS.

In other words, the wireless connection manager 26 may manage coexistence of multiple wireless communication units 30 that operate within the same spectrum, such as certain WLAN communication protocols and some PAN protocols as discussed above. The wireless connection manager 28 may include a coexistence scheme 27 (shown in FIG. 1 as "scheme 27") that indicates when (e.g., an interval) and how many packets each of the wireless communication units 30 may send, the size of the packets sent, and the like.

The wireless communication units 30 may each represent a wireless communication unit 30 that operates in accordance with one or more communication protocols to communicate encoded audio data 25 via a transmission channel to the sink device 14. In the example of FIG. 1, the wireless communication unit 30A is assumed for purposes of illustration to operate in accordance with the Bluetooth® suite of communication protocols. It is further assumed that the wireless communication unit 30A operates in accordance with A2DP to establish a PAN link (over the transmission channel) to allow for delivery of the encoded audio data 25 from the source device 12 to the sink device 14.

More information concerning the Bluetooth® suite of communication protocols can be found in a document entitled "Bluetooth Core Specification v5.0," published Dec. 6, 2016, and available at: www.bluetooth.org/en-us/specification/adopted-specifications. The foregoing Bluetooth Core Specification provides further details regarding a so-called Bluetooth Low Energy and Classic Bluetooth, where the Bluetooth Low Energy (BLE) operates using less energy than Classic Bluetooth. Reference to Bluetooth® (which may also be referred to as a "Bluetooth® wireless communication protocol") may refer to one of BLE and Classic Bluetooth or both BLE and Classic Bluetooth. More information concerning A2DP can be found in a document entitled "Advanced Audio Distribution Profile Specification," version 1.3.1, published on Jul. 14, 2015.

The wireless communication unit 30A may output the encoded audio data 25 as a bitstream 31 to the sink device 14 via a transmission channel, which may be a wired or wireless channel, a data storage device, or the like. While shown in FIG. 1 as being directly transmitted to the sink device 14, the source device 12 may output the bitstream 31 to an intermediate device positioned between the source device 12 and the sink device 14. The intermediate device may store the bitstream 31 for later delivery to the sink device 14, which may request the bitstream 31. The intermediate device may comprise a file server, a web server, a desktop computer, a laptop computer, a tablet computer, a mobile phone, a smart phone, or any other device capable of storing the bitstream 31 for later retrieval by an audio decoder. This intermediate device may reside in a content delivery network capable of streaming the bitstream 31 (and possibly in conjunction with transmitting a corresponding video data bitstream) to subscribers, such as the sink device 14, requesting the bitstream 31.

Alternatively, the source device 12 may store the bitstream 31 to a storage medium, such as a compact disc, a digital video disc, a high definition video disc or other storage media, most of which are capable of being read by a computer and therefore may be referred to as computer-readable storage media or non-transitory computer-readable storage media. In this context, the transmission channel may refer to those channels by which content stored to these mediums are transmitted (and may include retail stores and other store-based delivery mechanism). In any event, the techniques of this disclosure should not therefore be limited in this respect to the example of FIG. 1.

As further shown in the example of FIG. 1, the sink device 14 includes a wireless connection manager 40 that manages one or more of wireless communication units 42A-42N ("wireless communication units 42") according to a scheme 41, an audio decoder 44, and one or more speakers 48A-48N ("speakers 48"). The wireless connection manager 40 may operate in a manner similar to that described above with respect to the wireless connection manager 26, exposing an API to adjust scheme 41 by which operation of the wireless communication units 42 to achieve a specified QoS.

The wireless communication units 42 may be similar in operation to the wireless communication units 30, except that the wireless communication units 42 operate reciprocally to the wireless communication units 30 to decapsulate the encoded audio data 25. One of the wireless communication units 42 (e.g., the wireless communication unit 42A) is assumed to operate in accordance with the Bluetooth® suite of communication protocols and reciprocal to the wireless communication protocol 28A. The wireless communication unit 42A may output the encoded audio data 25 to the audio decoder 44.

The audio decoder 44 may operate in a manner that is reciprocal to the audio decoder 24. The audio decoder 44 may operate consistent with one or more of any of the above listed audio codecs, as well as, audio codecs not listed above, but that operate to decode the encoded audio data 25 to obtain mixed audio data 23'. The prime designation with respect to "mixed audio data 23" denotes that there may be some loss due to quantization or other lossy operations that occur during encoding by the audio encoder 24. The audio decoder 44 may output the mixed audio data 23' to one or more of the speakers 48.

Each of the speakers 48 represents a transducer configured to reproduce a soundfield from the mixed audio data 23'. The transducer may be integrated within the sink device 14 as shown in the example of FIG. 1, or may be communicatively coupled to the sink device 14 (via a wire or wirelessly). The speakers 48 may represent any form of speaker, such as a loudspeaker, a headphone speaker, or a speaker in an earbud. Furthermore, although described with respect to a transducer, the speakers 48 may represent other forms of speakers, such as the "speakers" used in bone conducting headphones that send vibrations to the upper jaw, which induces sound in the human aural system.

As noted above, the apps 20 may output audio data 21 to the mixing unit 22. Prior to outputting the audio data 21, the apps 20 may interface with the operating system to initialize an audio processing path for output via integrated speakers (not shown in the example of FIG. 1) or a physical connection (such as a mini-stereo audio jack, which is also known as 3.5 millimeter—mm—minijack). As such, the audio processing path may be referred to as a wired audio processing path considering that the integrated speaker is connected by a wired connection similar to that provided by the physical connection via the mini-stereo audio jack. The wired audio processing path may represent hardware or a combination of hardware and software that processes the audio data 21 to achieve a target quality of service (QoS).

To illustrate, one of the apps 20 (which is assumed to be the app 20A for purposes of illustration) may issue, when initializing or reinitializing the wired audio processing path, one or more requests 29A for a particular QoS for the audio data 21A output by the app 20A. The request 29A may specify, as a couple of examples, a high latency (that results in high quality) wired audio processing path, a low latency (that may result in lower quality) wired audio processing path, or some intermediate latency wired audio processing path. The high latency wired audio processing path may also be referred to as a high quality wired audio processing path, while the low latency wired audio processing path may also be referred to as a low quality wired audio processing path.

The audio manager 28 may represent a unit configured to manage processing of the audio data 21. That is, the audio manager 28 may configure the wired audio processing path within source device 12 in an attempt to achieve the requested target QoS. The audio manager 28 may adjust an amount of memory dedicated to buffers along the wired audio processing path for the audio data 21, shared resource priorities assigned to the audio data 21 that control priority when processed using shared resources (such as processing cycles of a central processing unit—CPU—or processing by a digital signal processor—DSP—to provide some examples), and/or interrupt priorities assigned to the audio data 21.

Configuring the wired audio processing path to suit the latency requirements of the app 20A may allow for more immersive experiences. For example, a high latency wired audio processing path may result in higher quality audio playback that allows for better spatial resolution that places a listener more firmly (in an auditory manner) in the soundfield, thereby increasing immersion. A low latency wired audio processing path may result in more responsive audio playback that allows game and operating system sound effects to arrive in real-time or near-real-time to match on-screen graphics, and allows for accurate soundfield reproduction in immersive virtual reality, augmented reality, and/or mixed-reality contexts and the like, accurate responsiveness for digital music creation contexts, and/or accurate responsiveness for playback during manipulation of virtual musical instruments.

Increasingly, however, source devices, such as the source device 12, may be designed in a manner that removes wired interfaces for communicating the mixed audio data 23, and instead promotes wireless interfaces provided via Bluetooth® and other PAN protocols for communicating the mixed audio data 23 to sink devices, including the sink device 14. Although primarily used for streaming audio data, the Bluetooth® protocol is a general purpose PAN protocol that was intended to replace RS-232 wired data communication between the source device and the sink device. The general purpose nature of Bluetooth® has resulted in a fixed latency for communicating data of approximately 150 milliseconds (ms), which is suitable for most data communications.

The fixed latency of 150 ms is also a result of the Bluetooth® protocol operating within the 2.4 Gigahertz (GHz) spectrum that is also reserved for wireless local area networks (e.g., WiFi™). As such, there needs to be sufficient latency injected into the Bluetooth® session to allow for receipt and/or transmission of wireless local area network (WLAN) packets over the same 2.4 GHz spectrum. In this respect, the 150 ms of fixed Bluetooth® latency is a compromise that achieves adequate data communication between the source and sink devices for most purposes.

In accordance with various aspects of the techniques described in this disclosure, the audio manager 28 may control latency for PAN communications between the source device 12 and the sink device 14 when streaming the audio data 21. Rather than resort to a fixed latency, the audio manager 28 may transition audio processing prior to delivery via the PAN session from a quality-focused processing path to a latency-focused processing path based on audio requirements requested by the app 20A via the request 29A for configuring the wired audio processing path for performing wired audio processing applied to the audio data 21 when output over a wired interface.

In operation, the audio manager 28 may configure various QoS metrics associated with the wireless audio processing path to achieve either high latency wireless audio processing or low latency wireless audio processing based on the request 29A specified for configuring the wired audio processing path for performing wired audio processing applied to the audio data 21 when output over the wired interface.

The wireless audio processing path is denoted as "wireless audio processing path 50A," and in the context of the source device 12, may include the mixing unit 22, the audio encoder 24, one or more buffers (not shown in FIG. 1 for ease of illustration purposes), and one or more of the wireless communication units 30 (which is assumed to be the wireless communication unit 30A for purposes of illustration). In the context of the sink device 14, the wireless audio processing path is denoted as "wireless audio processing path 50B" and includes one or more of the wireless communication units 42 (and is assumed for purposes of illustration to be the wireless communication unit 42A), one or more buffers (not shown in FIG. 1) for ease of illustration purposes), and the audio decoder 44.

The QoS metrics may include a compression ratio that the audio encoder 24 is to achieve, which is specific to the source device 12. Otherwise, in both the source device 12 and the sink device 14, the QoS metrics may include the amount of memory dedicated to buffering packets representative of the audio data, and the coexistence scheme 27 and/or 41 (when present at the source device 12 and/or the sink device 14). Other QoS metrics applicable to the source device 12 and/or the sink device 14 may include a thread priority associated with the wireless audio processing path 50, a scheduling period allocated to the wireless audio processing path 50, a wake up time associated with the wireless audio processing path 50, a battery usage allocated to the wireless audio processing path 50, and a link management function (e.g., a Bluetooth® or WiFi™ scan) associated with the wireless audio processing path 50.

However, rather than resort to the fixed 150 ms of latency, the audio manager 28 may adapt the QoS metrics for the wireless audio processing path 50A based on whether the app-in-focus (i.e., app 20A in the example of FIG. 1) requested the high latency wired audio processing path or the low latency wired audio processing path via request 29A. That is, the audio manager 28 may adjust various QoS metrics for the wireless audio processing path (based on the request 29A for the QoS of the wired audio processing path) to reduce latency when the app-in-focus 20A requested the low latency audio processing. Likewise, the audio manager 28 may adjust various QoS metrics for the wireless audio processing path to increase latency (and thereby potentially increase quality) when the app-in-focus 20A requested the high latency audio processing.

Generally, the app 20A issues the request 29A for the high latency audio processing when latency is not an issue compared to the quality of audio playback. For streaming audio data either alone or concurrent to video playback, the app 20A may issue the request 29A for the high latency audio processing to provide potentially higher quality audio playback. The app 20A may issue the request 29A for the low latency audio processing in circumstances where delayed audio playback may impact the aural experience, such as in gaming, virtual reality (VR), mixed reality (MR), or augmented reality (AR) contexts where it may not be possible to delay video and/or audio playback, including virtual musical instrument applications, music editing, etc.

The audio manager 28 may determine whether the app 20A is currently being displayed by the source device 12 (which may, in other words, refer to a determination of whether app 20A is currently the "app-in-focus"). The audio manager 28 may interface with the operating system (not shown in the example of FIG. 1) of the source device 12 to determine whether the app 20A is currently being displayed by the source device 12, interfacing with an API of the operating system to identify whether one or more of apps 20 are currently being displayed by the source device 12.

Responsive to determining that the app 20A is currently being displayed by the source device 12, the audio manager 28 may obtain the app-in-focus request 29A for either the high latency wired audio processing or the low latency wired audio processing, and dynamically adjust the QoS metrics of the wireless audio processing path 50A to target the fixed latency of 150 ms (when the high latency audio processing is requested) or a lower latency of 60 ms or below (when the low latency audio processing is requested). The audio manager 28 may adjust the above noted QoS metrics to transition the wireless audio processing path 50A supporting an existing PAN session from a high latency audio processing to the low latency audio processing, thereby decreasing the packet size and prioritizing the PAN session over any WLAN session operating in the same 2.4 GHz spectrum.

The audio manager 28 may adjust audio encoding 24 to achieve a target compression ratio by, at least in part, setting a time to play value within the audio packets representative of the encoded audio data 25 and/or adjusting a target bitrate. Decreasing the time to play (which may also be referred to as a timestamp) may result in less time to encode/decode the audio packet, thereby resulting in less efficient compression that lowers the resolution of the audio data. Increasing the time to play QoS metric may result in more time to encode/decode the audio packet, thereby resulting in more efficient compression that preserves the resolution of the audio data.

That is, the time to play QoS metric indicates when the audio data is to be rendered on the sink device 14. The higher the value for the time to play QOS metric, the later the audio will be played (which may result in more buffering of the audio data on the sink device 14, resulting in more robustness as there is more time to send subsequent packets).

Decreasing the target bitrate may result in increased compression that lowers a resolution of the underlying mixed audio data 23. Increasing the target bitrate may result in decreased compression that increases the resolution of the underlying mixed audio data 23. The audio manager 28 may decrease or increase the target bitrate to adjust the latency of the wireless audio processing path 50A in large increments. The audio manager 28 may decrease or increase the time to play value to adjust the latency of wireless audio processing path 50A in smaller increments compared to adjustments of the latency based on decreasing or increasing the target bitrate.

The audio manager 28 may, in some examples, determine a number (or, in other words, a plurality) of compression ratios (including a minimum and maximum compression ratio) based on a quality of the PAN session (or, in other words, a wireless link). The audio manager 28 may determine a quality of the PAN session in terms of one or more of a bitrate, a signal to noise ratio (SNR), a number of retransmission requests, etc. The audio manager 28 may use the maximum and minimum compression ratios to define the bitrate QoS metric, where the minimum compression ratio may define the bitrate for the high latency audio processing, and the maximum compression ratio may define the bitrate for the low latency audio processing.

The audio manager 28 may configure, according to the QoS metrics, the wireless audio processing path 50A to transition either from the high latency audio processing to the low latency audio processing or from the low latency audio processing to the high latency audio processing. The audio manager 28 may continue to monitor interaction with the source device 12 and detect when a different one of apps 20 becomes the app-in-focus (meaning that the audio manager 28 may determine whether the source device 12 is currently displaying the different one of apps 20). The audio manager may obtain, when the different one of the apps 20 becomes the app-in-focus, an indication of which audio processing the different app requested, and transition the wireless audio processing path 50A to be either high latency or low latency depending on the indication of which audio processing the different one of apps 20 requested via a corresponding one of requests 29.

Some PAN protocols, such as Bluetooth®, may utilize fixed packet sizes that are transmitted at regular intervals. Switching from the high latency audio processing to the low latency audio processing for the fixed packet size and regular interval transmission PAN protocols may reduce latency by increasing the compression ratio to produce packets that represent more audio data while also increasing the regular transmission interval (or, in other words, sending packets less often), which may increase robustness of transmission. Transmitting the packets less often also results in increasing the latency (to some extent).

As a result of reconfiguring the wireless audio processing path 50A using the QoS metrics, the one of wireless communication unit 20 maintaining the PAN session (i.e., the wireless communication unit 20A in the example of FIG. 1) may adjust an amount of compression applied to the audio data to be streamed, the amount of memory dedicated to buffering the audio data to be processed by the requested audio processing, the coexistence scheme specifying how bandwidth is shared between the PAN session and other wireless sessions utilizing the same 2.4 GHz spectrum, and the corresponding audio processing in the sink device 14. The various adjustments may result in increased or decreased latency.

In this respect, the techniques may allow the source device 12 participating in a PAN session to adjust the existing PAN session to transition from low latency audio processing to high latency audio processing or from high latency audio processing to low latency audio processing. Rather than initiate a new PAN session configured to be either high latency audio processing or low latency audio processing, the techniques may dynamically adjust, responsive to the audio processing requests 29 of the app-in-focus, the existing PAN session by reconfiguring various QoS metrics associated with the wireless audio processing path 50A. As such, the apps 20 may direct configuration of the wireless audio processing path to control latency.

Although described as adjusting the wireless audio processing path 50A, the audio processing path in some PAN protocols, such as Bluetooth®, is defined by the PAN protocol itself or via various profiles, such as A2DP in the context of Bluetooth®. A2DP provides a specification for incorporating audio codecs into a unidirectional link established over Bluetooth®. As such, the wireless audio processing path 21 may represent another way by which to refer to the PAN link between the source device 12 and the sink device 14.

As noted above, the audio manager 28 may interface or otherwise signal (via a bitstream 31 output from the wireless communication unit 30A of the source device 12 to the wireless communication unit 42A of the sink device 14) the latency requested via the request 29A to the sink device 14. As such, sink device 14 may obtain an indication for the QoS concerning audio processing applied to the encoded audio data 25 represented in the bitstream 31. The sink device 14 may, as also shown in the example of FIG. 1, include an audio manager 46. The audio manager 46 may be similar to the audio manager 28 in that the audio manager 46 may obtain the requested QoS for the wired audio processing path, and configure a wireless audio processing path 50B based on the requested QoS for the wired audio processing path.

Responsive to receiving the requested latency, the audio manager 46 may configure the wireless audio processing path 50B to adjust an amount of memory supporting various buffers, interrupt priorities, etc. The audio manager 46 may, in other words, adjust various QoS metrics associated with the wireless audio processing path 50B. As noted above, in the context of the sink device 14, the QoS metrics may include the amount of memory dedicated to buffering packets representative of the audio data, and the coexistence scheme 27 and/or 41 (when present at the source device 12 and/or the sink device 14).

Rather than resort to the fixed 150 ms of latency, the audio manager 46 may adapt the QoS metrics for the wireless audio processing path 50B based on whether the app-in-focus (i.e., app 20A in the example of FIG. 1) requested the high latency wired audio processing path or the low latency wired audio processing path via request 29A. That is, the audio manager 46 may adjust various QoS metrics for the wireless audio processing path 50B (based on the obtained indication for a QoS concerning wired audio processing applied to the audio data) to reduce latency when the app-in-focus 20A requested the low latency audio processing. Likewise, the audio manager 46 may adjust various QoS metrics for the wireless audio processing path to increase latency (and thereby potentially increase quality) when the app-in-focus 20A requested the high latency audio processing.

The sink device 14 may, after configuring the wireless audio processing path 50B, process the bitstream 31 using the wireless audio processing path 50B. The wireless audio processing path 50B may first invoke the audio decoder 44, which may perform reciprocal operations to those performed by the audio encoder 24 to obtain the mixed audio data 23'. The mixed audio data 23' may include one or more spatial channels of audio data (such as a left channel, and a right channel of a stereo audio signal). The audio decoder 44 may output the mixed audio data 23' to the one or more of speakers 48. In this respect, the wireless audio processing path 50B may process the bitstream 31 to obtain the mixed audio data 23', and output the mixed audio data 23' to the one or more speakers 48.

The techniques may, in this respect, coordinate configuration of the overall wireless processing path 50 (which may refer to the combination of the wireless audio processing path 50A of the source device 12 and the wireless audio processing path 50B of the sink device 14) to achieve either high latency (and potentially high quality), low latency (and potentially respectively degraded quality compared to the high latency audio processing) or some intermediate latency between the high and low latency audio processing paths. Various aspects of the techniques may enable system 10 to achieve latencies for the overall wireless processing path that are lower than the set 150 ms, and as low as 50-60 ms and potentially lower for certain contexts (e.g., 20-30 ms for VR, AR, or MR).

Figure 2A:
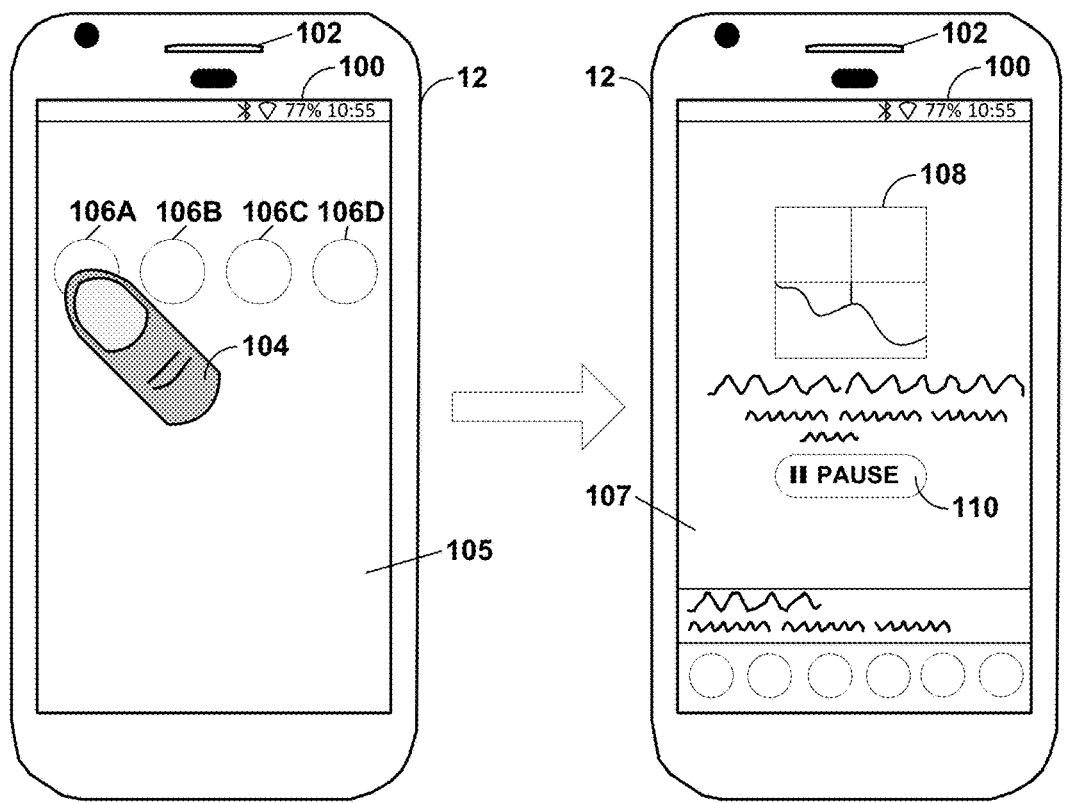
FIGS. 2A-2C are diagrams illustrating the source device of FIG. 1 in performing various aspects of the techniques described in this disclosure.
Figure 2B:
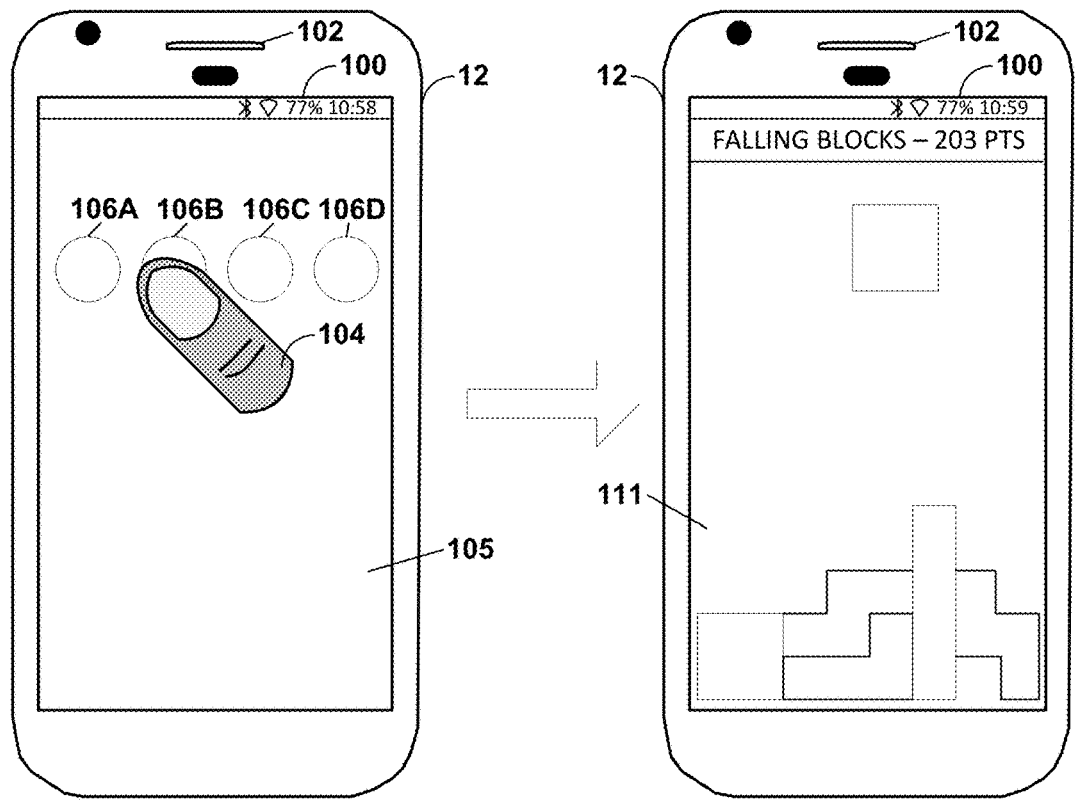
Figure 2C:
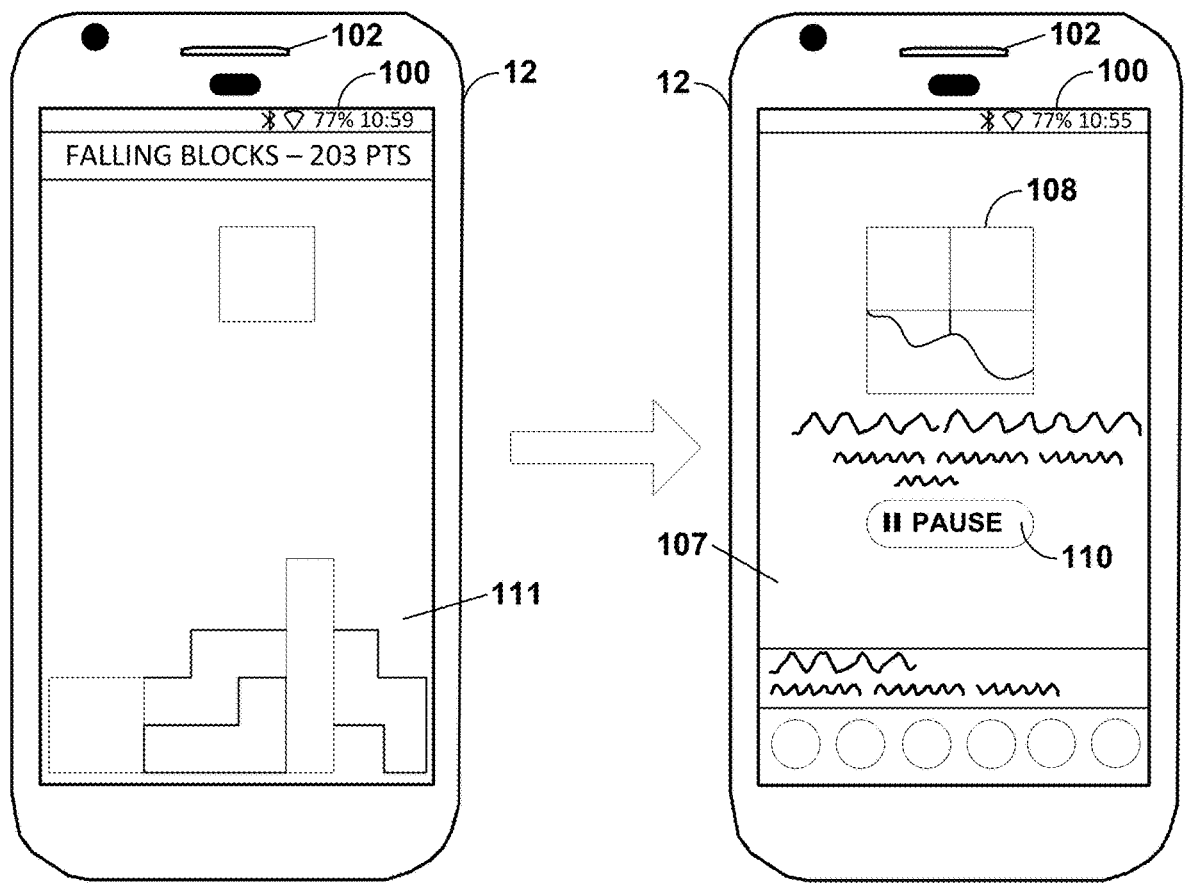

FIGS. 2A-2C are diagrams illustrating the source device 12 of FIG. 1 in performing various aspects of the techniques described in this disclosure. Referring first to FIG. 2A, the source device 12 includes a display 100 and an integrated speaker 102. The display 100 may represent any type of display capable of displaying images, such as a light emitting diode (LED) display, an organic LED display, and a liquid crystal display (LCD). In some examples, the display 100 may comprise a touchscreen that operates as an input device by responding to touch or other physical contact with an input implement 104, such as the user's finger shown in the example of FIG. 2A. As such, the display 100 may be referred to as a touchscreen 100. The integrated speaker 102 may represent a transducer configured to output sounds via the wired audio processing path.

Although illustrated as a human finger, the input implement 104 may be any conceivable implement with which a user may interact with the source device 12. For example, in a VR application, the input implement 104 may utilize eye gaze detection to identify which aspect of the VR scene the user is looking, thereby selecting the QoS requested by the portion of the VR scene at which the user is looking (where the portion of the VR scene may represent the so-called "app-in-focus"). As another example, the user may utilize a mouse or other input device to identify (either by hovering a pointer over or by selecting) the app-in-focus.

In the example of FIG. 2A, the display 100 of the source device 12 shown to the left of the arrow is presenting a home screen image 105, which is an image generated by the operating system of the source device 12 to allow the user to initiate execution of one or more apps 20. The apps 20 are represented in the home screen image 103 as icons 106A-106D ("icons 106"). The input implement 104 may select icon 106A by interfacing with the touchscreen 100 at the location at which icon 106A is presented within the home screen image 105.

Responsive to selection of the icon 106A, the operating system of the source device 12 may execute one of the apps 20 associated with the selected icon 106A. The one of apps 20 (which is assumed for purposes of illustration to be the app 20A) may generate an image 107, which touchscreen 100 may display as shown to the right of the arrow in the example of FIG. 2A. The image 107 presented by the touchscreen 100 shows an album cover 108, and user interface elements 110 to pause playback of audio data 21. As such, the app 20A represents, in the example of FIG. 2A, an audio streaming application that streams audio data for audio playback by the sink device 14.

In the example shown in FIG. 2A in which the app 20A represents the music streaming application, the app 20A may issue a request 29A for a high latency wired audio processing path so as to output high resolution audio data that results in potentially high fidelity recreation of the soundfield. The audio manager 28 may receive the request 29A and store the QoS of high quality for the app 20A.

The audio manager 28 may next interface with the operating system of the source device 12 to determine whether the app 20A is currently being displayed by the source device 12. Responsive to determining that the app 20A is currently being displayed by the source device 12, the audio manager 28 may configure the wireless audio processing path 50A to support high quality audio processing. The audio manager 28 may also communicate the request 29A for high quality audio processing to the audio manager 46 of the sink device 14. The audio manager 46 of the sink device 14 may configure the wireless audio processing path 50B to support high quality audio processing, thereby establishing the overall wireless audio processing path to support high quality (and high latency) audio processing.

Referring next to the example of FIG. 2B, the user has transitioned from the music streaming app 20A back to the home screen image 105. The input implement 104, as shown to the left of the arrow in FIG. 2B, may interface with the touchscreen 100 to select a different one of the icons 106 (i.e., the icon 106B in the example of FIG. 2B). The operating system, responsive to determining that the input implement 104 has selected the location of the icon 106B in the home screen image 105, may execute one of apps 20 associated with the icon 106B (which is assumed for purposes of illustration to correspond to app 20B). The operating system may execute the app 20B, resulting in display of image 111. The app 20B is shown as being a gaming application.

In the example shown in FIG. 2B in which the app 20B represents the gaming application, the app 20B may issue a request 29B for a low latency wired audio processing path so as to output audio data 21 with low latency so as to facilitate synchronization of sounds with images 111 output by the app 20B and allow for accurate game playing. The audio manager 28 may receive the request 29B and store the QoS of low latency for the app 20B.

The audio manager 28 may next interface with the operating system of the source device 12 to determine whether the app 20B is currently being displayed by the source device 12. Responsive to determining that the app 20B is currently being displayed by the source device 12, the audio manager 28 may configure the wireless audio processing path 50A to support low latency audio processing. The audio manager 28 may also communicate the request 29B for low latency audio processing to the audio manager 46 of the sink device 14. The audio manager 46 of the sink device 14 may configure the wireless audio processing path 50B to support low latency audio processing, thereby establishing the overall wireless audio processing path 50 to support low latency audio processing (and potentially degraded audio quality compared to the high latency audio processing).

In the example of FIG. 2C, a state of the source device 12 shown to the left of the arrow is the same as the state of the source device 12 shown to the right of the arrow in FIG. 2B. The input implement 104 may interface with the touchscreen 100 to switch between execution of the app 20B and the app 20A, resulting in the operating system resuming execution of the app 20A as shown to the right of the arrow in FIG. 2C. The audio manager 28 may determine that the touchscreen is currently presenting image 107 associated with the app 20A, and therefore that the app 20A is the so-called "app-in-focus."

Responsive to detecting that the app 20A is currently being displayed by the source device 12 via the touchscreen 100, the audio manager 28 may retrieve the previously requested QoS, and reconfigure the wireless audio processing path 50A to perform high quality audio processing. When the app 20B was currently being displayed by the source device 12 as shown in the example of FIG. 2B, the app 20A may have continued to stream audio data 21A, which the mixing unit 22 may have mixed with audio data 21B output by the app 20B. Although the app 20A may have requested high quality audio processing, the audio manager 28 may configure the wireless audio processing path 50A to provide low latency audio processing as the app 20B was determined to be the "app-in-focus" or in other words currently being displayed by the source device 12. Responsive to determining that the app 20A is currently being displayed by the source device 12 as shown to the right of the arrow in the example of FIG. 2C, the audio manager 28 may reconfigure the wireless audio processing path 50A to provide high quality audio processing (at the expense of latency).

Figure 3:
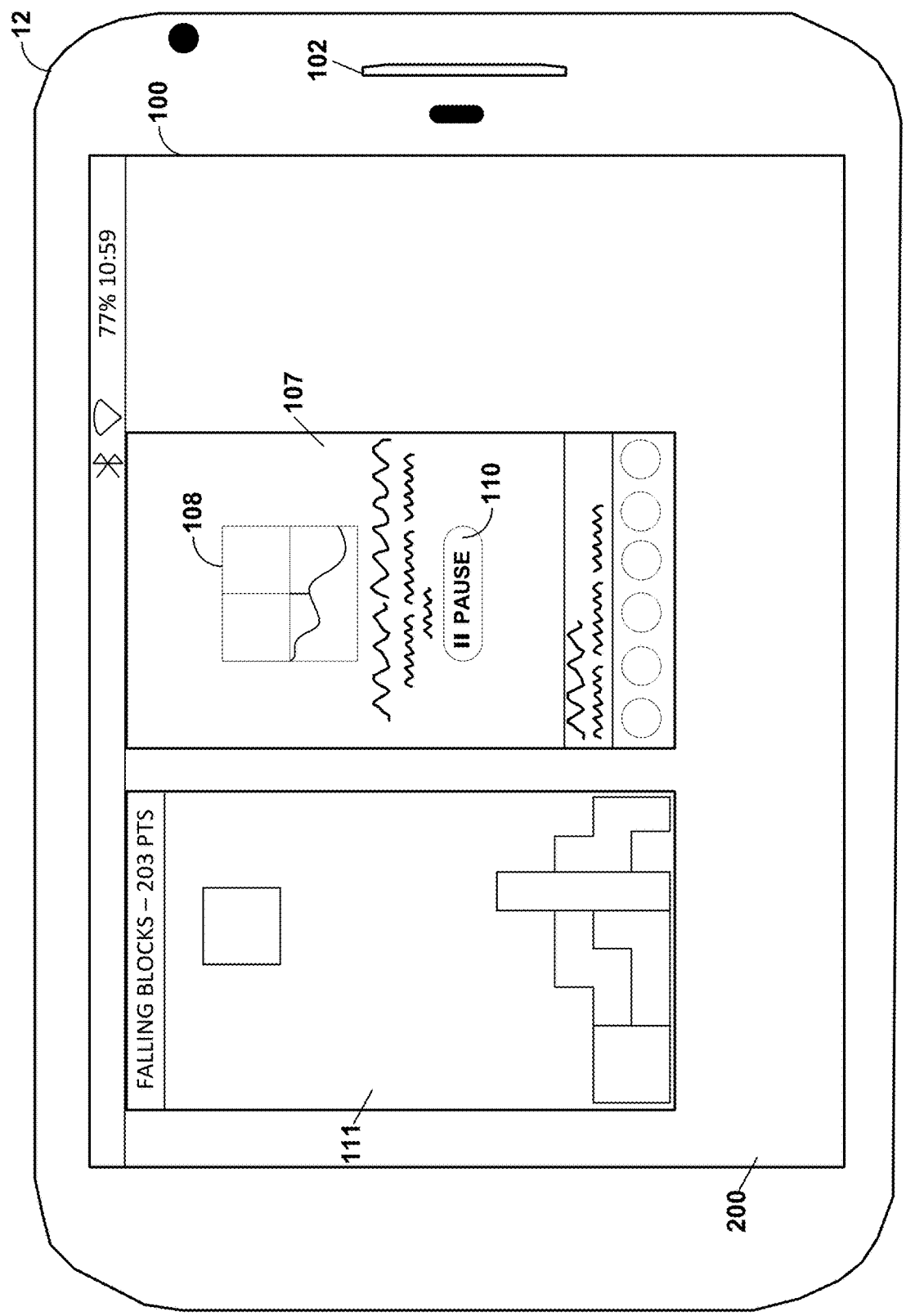
FIG. 3 is a diagram illustrating another example of the source device of FIG. 1 in performing various aspects of the techniques described in this disclosure.

FIG. 3 is a diagram illustrating another example of the source device 12 of FIG. 1 in performing various aspects of the techniques described in this disclosure. The example of source device 12 in FIG. 3 is similar to the example of the source device 12 in FIGS. 2A-2C in that the source device 12 shown in FIG. 3 includes the display 100 and the integrated speakers 102. However, the source device 12 in the example of FIG. 3 is capable of concurrently displaying image 107 from the app 20A and the image 111 from the app 20B as windows within an image 200.

In this example, the audio manager 28 may store the separate requests 29A and 29B for each of the apps 20A and 20B respectively. The audio manager 28 may determine whether one or both of the apps 20A and 20B are currently being displayed by the source device 12. When only one of the apps 20A and 20B are currently being displayed by the source device 12, the audio manager 28 functions in the manner described above with respect to the examples of FIGS. 2A-2C.

In the example of FIG. 3 where both of the apps 20A and 20B are currently being displayed, the audio manager 28, responsive to the determination that both the apps 20A and 20B are currently being displayed, compare the QoS requested via the request 29A (which may be referred to as a "first QoS") to the QoS requested via the request 29B (which may be referred to as a "second QoS"). The audio manager 28 may select the one of the first QoS or the second QoS that results in the lowest relative latency. The audio manager 28 may next reconfigure the wireless audio processing path 50A to achieve the selected one of the first QoS or the second QoS.

After reconfiguring the wireless audio processing path 50A, the mixing unit 22 may mix the audio data 21A with the audio data 21B to obtain the mixed audio data 23. The wireless audio processing path 50A may continue to process the mixed audio data 23 to obtain the bitstream 31 representative of the mixed audio data. The source device 12 may then transmit the bitstream 31 to the sink device 14 in accordance with the wireless communication protocol.

Figure 4:
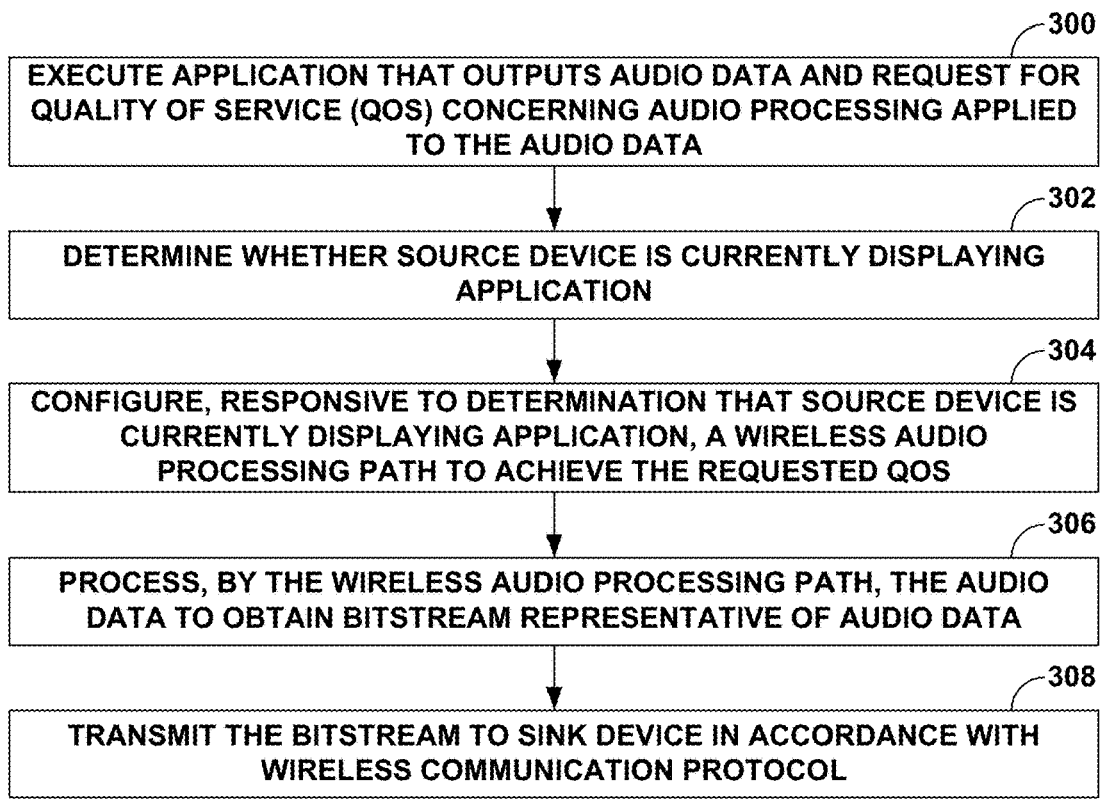
FIG. 4 is a flowchart illustrating example operation of the source device of FIG. 1 in performing various aspects of the techniques described in this disclosure.

FIG. 4 is a flowchart illustrating example operation of the source device 12 of FIG. 1 in performing various aspects of the techniques described in this disclosure. As shown in the example of FIG. 4, the source device 12 may first execute an application 20A that outputs audio data 21A and a request 29A for a QoS concerning audio processing applied to the audio data 21A (300). The audio manager 28 of the source device 12 may receive the request 29A and determine whether the source device 12 is currently displaying the application 20A (302). The audio manager 28 may configure, responsive to the determination that the source device 12 is currently displaying the application 20A, a wireless audio processing path 50A to achieve the requested QoS (304).

The audio manager 28 may next initiate audio processing by the wireless audio processing path 50A. As such, the mixing unit 22 may mix the audio data 21 to obtain mixed audio data 23, which the audio encoder 24 may encode to obtain encoded audio data 25. One or more of the wireless communication units 30 may further process the encoded audio data 25 to obtain the bitstream 31. In this way, the wireless audio processing path may process the audio data to obtain the bitstream 31 representative of the mixed audio data 23 (306). The one or more of the wireless communication units 30 may output the bitstream 31 to the sink device 14 in accordance with a wireless communication protocol (308).

Figure 5:
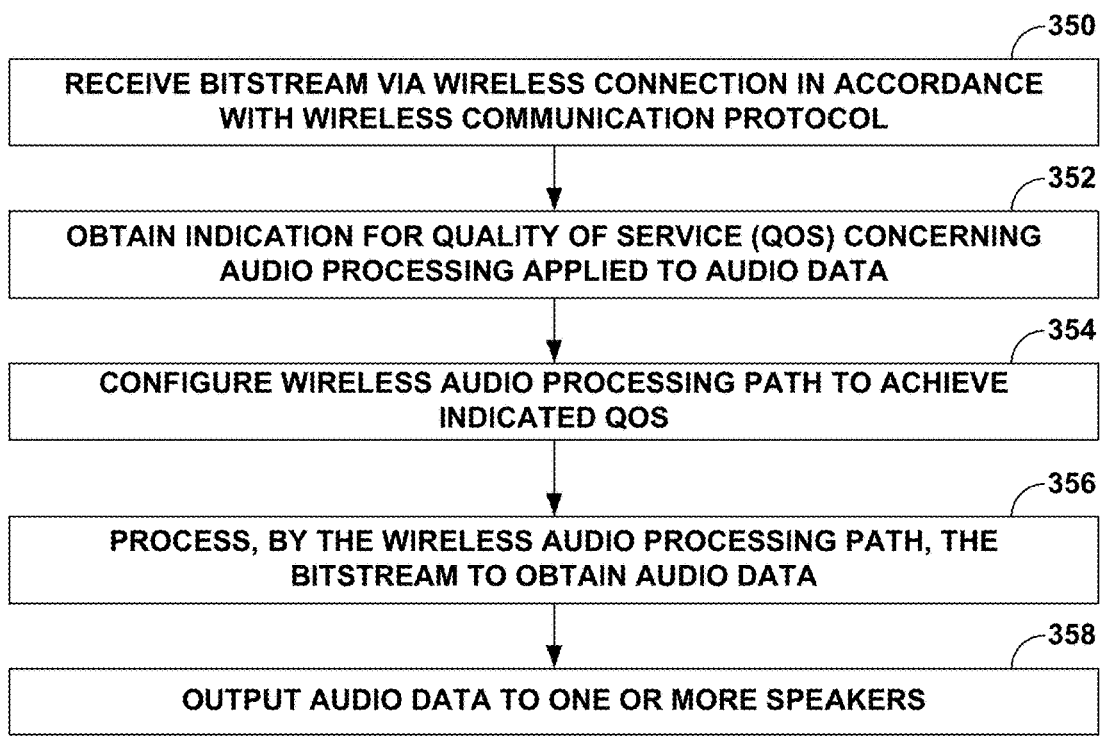
FIG. 5 is a flowchart illustrating example operation of the sink device of FIG. 1 in performing various aspects of the techniques described in this disclosure.

FIG. 5 is a flowchart illustrating example operation of the sink device 14 of FIG. 1 in performing various aspects of the techniques described in this disclosure. As shown in the example of FIG. 5, the sink device 14 may receive, via a wireless connection provided by one or more of the wireless communication units 42 in accordance with a wireless communication protocol, the bitstream 31 (350). The audio manager 46 of the sink device 14 may further obtain an indication for a QoS concerning audio processing applied to the mixed audio data 23' represented by the bitstream 31 (352).

Thea audio manager 46 may next configure the wireless audio processing path 50B to achieve the indicated QoS (354). The audio manager 46 may initiate audio processing by the wireless audio processing path 50B, which may result in one or more of the wireless communication units 42 processing the bitstream 31 to obtain the encoded audio data 25 followed by the audio decoder 44 performing audio decoding with respect to the encoded audio data 25 to obtain the mixed audio data 23'. In this way, the sink device 14 may process, by the wireless audio processing path 50B, the bitstream 21 to obtain the mixed audio data 23' (356). The audio decoder 44 may output the mixed audio data 23' to one or more of the speakers 48 (358).

Figure 6:
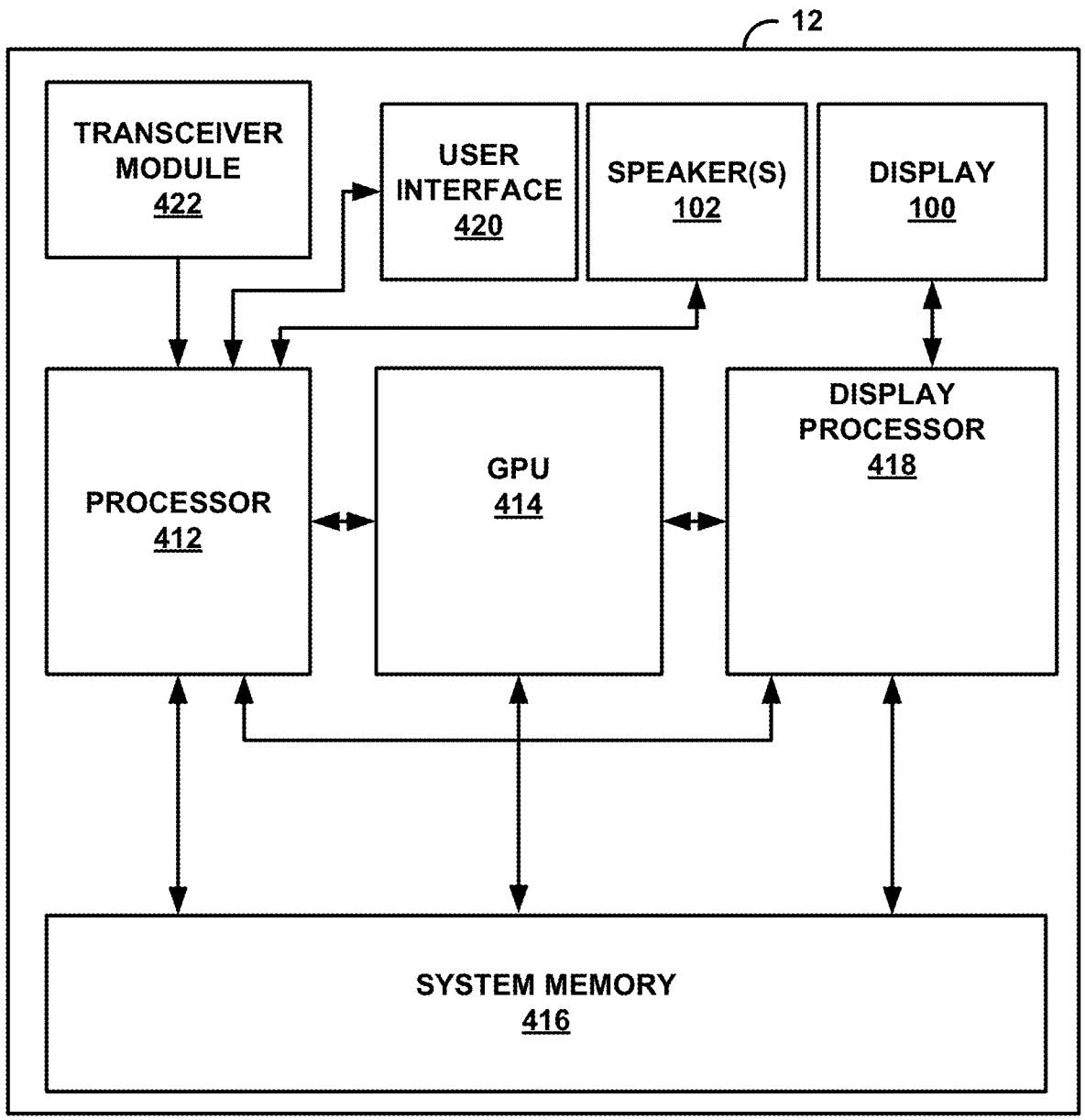
FIG. 6 is a block diagram illustrating example components of the source device shown in the example of FIG. 1.

FIG. 6 is a block diagram illustrating example components of the source device 12 shown in the example of FIG. 1. In the example of FIG. 6, the source device 12 includes a processor 412, a graphics processing unit (GPU) 414, system memory 416, a display processor 418, one or more integrated speakers 102, a display 100, a user interface 420, and a transceiver module 422. In examples where the source device 12 is a mobile device, the display processor 418 is a mobile display processor (MDP). In some examples, such as examples where the source device 12 is a mobile device, the processor 412, the GPU 414, and the display processor 418 may be formed as an integrated circuit (IC).

For example, the IC may be considered as a processing chip within a chip package, and may be a system-on-chip (SoC). In some examples, two of the processors 412, the GPU 414, and the display processor 418 may be housed together in the same IC and the other in a different integrated circuit (i.e., different chip packages) or all three may be housed in different ICs or on the same IC. However, it may be possible that the processor 412, the GPU 414, and the display processor 418 are all housed in different integrated circuits in examples where the source device 12 is a mobile device.

Examples of the processor 412, the GPU 414, and the display processor 418 include, but are not limited to, one or more digital signal processors (DSPs), general purpose microprocessors, application specific integrated circuits (ASICs), field programmable logic arrays (FPGAs), or other equivalent integrated or discrete logic circuitry. The processor 412 may be the central processing unit (CPU) of the source device 12. In some examples, the GPU 414 may be specialized hardware that includes integrated and/or discrete logic circuitry that provides the GPU 414 with massive parallel processing capabilities suitable for graphics processing. In some instances, GPU 14 may also include general purpose processing capabilities, and may be referred to as a general purpose GPU (GPGPU) when implementing general purpose processing tasks (i.e., non-graphics related tasks). The display processor 418 may also be specialized integrated circuit hardware that is designed to retrieve image content from the system memory 416, compose the image content into an image frame, and output the image frame to the display 100.

The processor 412 may execute various types of the applications 20. Examples of the applications 20 include web browsers, e-mail applications, spreadsheets, video games, other applications that generate viewable objects for display, or any of the application types listed in more detail above. The system memory 416 may store instructions for execution of the applications 20. The execution of one of the applications 20 on the processor 412 causes the processor 412 to produce graphics data for image content that is to be displayed and the audio data 21 that is to be played (possibly via integrated speaker 102). The processor 412 may transmit graphics data of the image content to the GPU 414 for further processing based on instructions or commands that the processor 412 transmits to the GPU 414.

The processor 412 may communicate with the GPU 414 in accordance with a particular application processing interface (API). Examples of such APIs include the DirectX® API by Microsoft®, the OpenGL® or OpenGL ES® by the Khronos group, and the OpenCL™; however, aspects of this disclosure are not limited to the DirectX, the OpenGL, or the OpenCL APIs, and may be extended to other types of APIs. Moreover, the techniques described in this disclosure are not required to function in accordance with an API, and the processor 412 and the GPU 414 may utilize any technique for communication.

The system memory 416 may be the memory for the source device 12. The system memory 416 may comprise one or more computer-readable storage media. Examples of the system memory 416 include, but are not limited to, a random access memory (RAM), an electrically erasable programmable read-only memory (EEPROM), flash memory, or other medium that can be used to carry or store desired program code in the form of instructions and/or data structures and that can be accessed by a computer or a processor.

In some aspects, the system memory 416 may include instructions that cause the processor 412, the GPU 414, and/or the display processor 418 to perform the functions ascribed in this disclosure to the processor 412, the GPU 414, and/or the display processor 418. Accordingly, the system memory 416 may be a computer-readable storage medium having instructions stored thereon that, when executed, cause one or more processors (e.g., the processor 412, the GPU 414, and/or the display processor 418) to perform various functions.

The system memory 416 may include a non-transitory storage medium. The term "non-transitory" indicates that the storage medium is not embodied in a carrier wave or a propagated signal. However, the term "non-transitory" should not be interpreted to mean that the system memory 416 is non-movable or that its contents are static. As one example, the system memory 416 may be removed from the source device 12, and moved to another device. As another example, memory, substantially similar to the system memory 416, may be inserted into the source device 12. In certain examples, a non-transitory storage medium may store data that can, over time, change (e.g., in RAM).

The user interface 420 may represent one or more hardware or virtual (meaning a combination of hardware and software) user interfaces by which a user may interface with the source device 12. The user interface 420 may include physical buttons, switches, toggles, lights or virtual versions thereof. The user interface 420 may also include physical or virtual keyboards, touch interfaces—such as a touchscreen, haptic feedback, and the like.

The processor 412 may include one or more hardware units (including so-called "processing cores") configured to perform all or some portion of the operations discussed above with respect to one or more of the mixing unit 22, the audio encoder 24, the wireless connection manager 26, the audio manager 28, and the wireless communication units 30. The transceiver module 422 may represent a unit configured to establish and maintain the wireless connection between the source device 12 and the sink device 14. The transceiver module 422 may represent one or more receivers and one or more transmitters capable of wireless communication in accordance with one or more wireless communication protocols. The transceiver module 422 may perform all or some portion of the operations of one or more of the wireless connection manager 26 and the wireless communication units 30.

Figure 7:
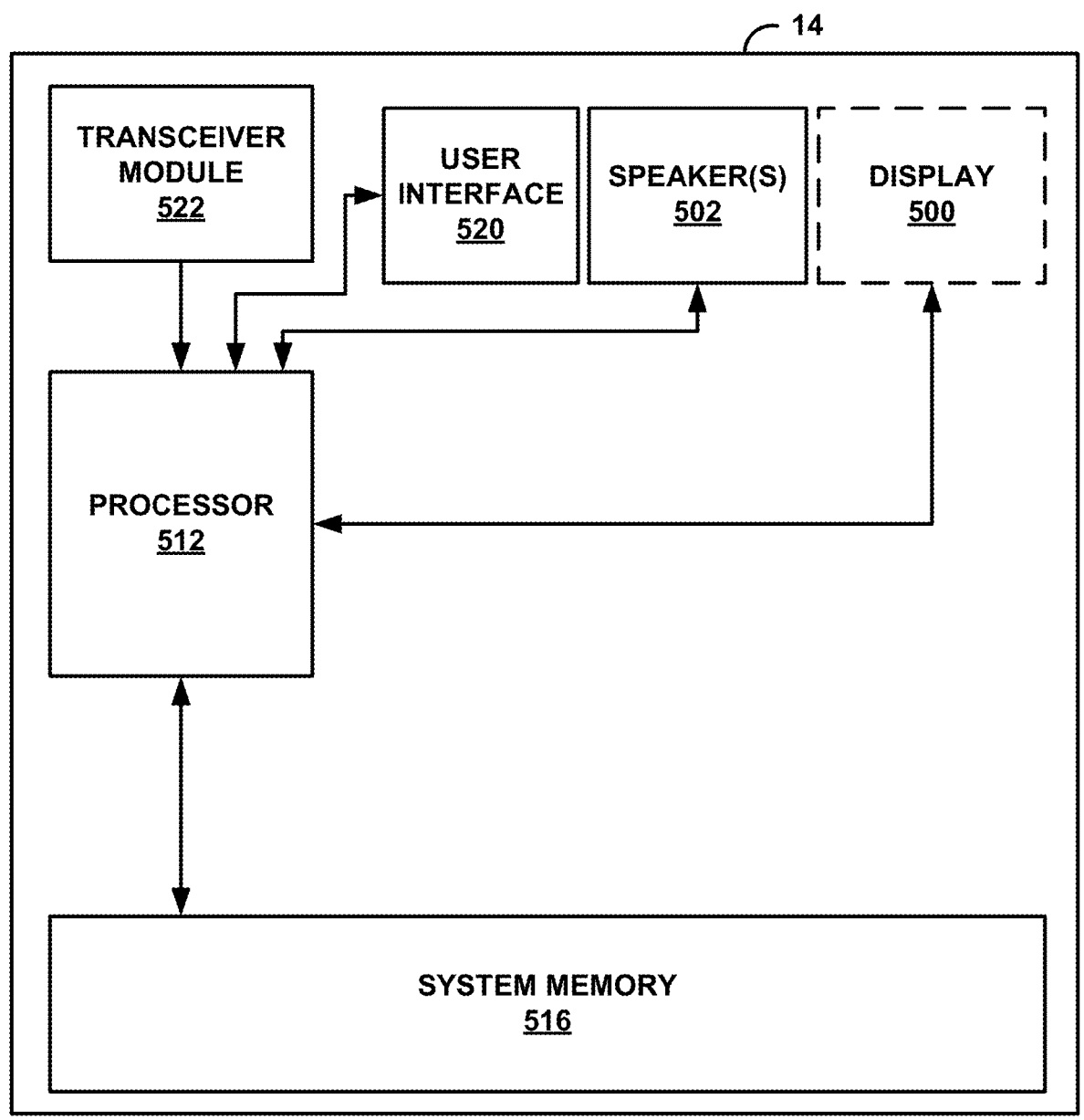
FIG. 7 is a block diagram illustrating exemplary components of the sink device shown in the example of FIG. 1.

FIG. 7 is a block diagram illustrating exemplary components of the sink device 14 shown in the example of FIG. 1. Although the sink device 14 may include components similar to that of the source device 12 discussed above in more detail with respect to the example of FIG. 6, the sink device 14 may, in certain instances, include only a subset of the components discussed above with respect to the source device 12.

In the example of FIG. 7, the sink device 14 includes one or more speakers 502, a processor 512, a system memory 516, a user interface 520, and a transceiver module 522. The processor 512 may be similar or substantially similar to the processor 412. In some instances, the processor 512 may differ from the processor 412 in terms of total processing capacity or may be tailored for low power consumption. The system memory 516 may be similar or substantially similar to the system memory 416. The speakers 502, the user interface 520, and the transceiver module 522 may be similar to or substantially similar to the respective speakers 402, user interface 420, and transceiver module 422. The sink device 14 may also optionally include a display 500, although the display 500 may represent a low power, low resolution (potentially a black and white LED) display by which to communicate limited information, which may be driven directly by the processor 512.

The processor 512 may include one or more hardware units (including so-called "processing cores") configured to perform all or some portion of the operations discussed above with respect to one or more of the wireless connection manager 40, the wireless communication units 42, the audio decoder 44, and the audio manager 26. The transceiver module 522 may represent a unit configured to establish and maintain the wireless connection between the source device 12 and the sink device 14. The transceiver module 522 may represent one or more receivers and one or more transmitters capable of wireless communication in accordance with one or more wireless communication protocols. The transceiver module 522 may perform all or some portion of the operations of one or more of the wireless connection manager 40 and the wireless communication units 28.

In other words, until now every implementation of audio streaming over Bluetooth® from a phone/tablet to a pair of stereo headset has been implemented using a fixed latency. As wireless headphones become more widely adopted as the primary way by which users consume audio data, it may become more important to have low latency audio streaming when dealing with video games and similar applications.

One problem may be that low latency streaming over Bluetooth® is inherently less robust. To compensate for the robustness, higher audio compression may be performed but this reduces audio quality. As such, it may be beneficial to switch between various latency settings and, in some implementations, adjust the coexistence scheme with other radio frequency (RF) radios (and therefore various levels of audio quality) based on what a user is doing on his/her app executed by the source device.

The audio subsystem of an operating system (such as Android™) executed on source devices is complex and may include many different audio processing paths. Some audio processing paths are low latency audio processing paths (for example audio tones, click sound of a keyboard, game applications, etc.) and some audio processing paths are high latency audio processing paths path (like the audio from a media player). Those sounds may be mixed and the output (e.g., the mixed audio data 23) of the mixer (such as the mixing unit 22) is sent over Bluetooth® to the sink device (e.g., wireless stereo headphones).

Due to the nature of the Bluetooth® link, the latency is fixed and set to a relatively high value (say 150 ms). The app (e.g., the app 20A) running on the source devices (e.g., phones or tablets) can advertise whether they require a low latency audio processing path or high latency audio processing path. However, apps may execute concurrently and generate audio at the same time (for example when the user is listening to some album while typing an email and the click of the keyboard is also rendered).

If the system was monitoring all those audio paths, the system would not be able to distinguish easily whether to set the Bluetooth® path to be a low latency audio processing path or a high latency audio processing path. Switching too often is not advised either as due to the link, this would/could result in audio artefacts.

One way to address these competing concerns may be to send two types of audio (low latency and high latency) via two different A2DP links or by marking the packets to indicate which type of latency was required. However, this solution may result in too much bandwidth required in certain contexts and would not scale well in the event of having to handle more than two different latencies. Further, the solution may require the instantiation of multiple encoders and/or decoders to handle the various different compression ratios that may be required. In addition, this solution may require multiplexing/demultiplexing code in the source device and the sink device. The resulting system may be too complex, require higher power consumption, and require increased memory.

Another solution may be to establish a given bandwidth threshold that when exceeded would result in mixing the high latency path with the low latency path. The system may then send the mixed audio data via the low latency packet type. The system in this configuration was potentially problematic as the system may have to define the threshold, and at the sink level, a delay may be inserted to prevent audio artefact at the time of the switch. This resulting system would thereby become complex.

The techniques of this disclosure includes monitoring the app in focus, querying whether the said app requires high or low latency. The app in focus becomes the app directing whether low latency streaming over Bluetooth® or a higher latency is required. When multiple apps are in focus (like in some source devices, such as tablets), the target latency is driven by the app asking for the lowest system latency. Adjusting the latency requires adjustment of the compression applied by the audio codec used, the adjustment of buffering used along the app in focus audio path at the source level, potentially adjustment of the coexistence scheme employed during the streaming, and adjustment of the audio path in the sink device.

The techniques discussed in this disclosure may be less complex relative to the two proceeding alternative solutions while also is simple to implement and scale well (more than just low and high latency can be handled). As a result of being less complex, the techniques may provide benefits for Bluetooth®, particularly the Bluetooth® low energy profile for audio streaming.

The foregoing techniques may be performed with respect to any number of different contexts and audio ecosystems. A number of example contexts are described below, although the techniques should be limited to the example contexts. One example audio ecosystem may include audio content, movie studios, music studios, gaming audio studios, channel-based audio content, coding engines, game audio stems, game audio coding/rendering engines, and delivery systems.

The movie studios, the music studios, and the gaming audio studios may receive audio content. In some examples, the audio content may represent the output of an acquisition. The movie studios may output channel-based audio content (e.g., in 2.0, 5.1, and 7.1) such as by using a digital audio workstation (DAW). The music studios may output channel-based audio content (e.g., in 2.0, and 5.1) such as by using a DAW. In either case, the coding engines may receive and encode the channel-based audio content based one or more codecs (e.g., AAC, AC3, Dolby True HD, Dolby Digital Plus, and DTS Master Audio) for output by the delivery systems. The gaming audio studios may output one or more game audio stems, such as by using a DAW. The game audio coding/rendering engines may code and or render the audio stems into channel-based audio content for output by the delivery systems. Another example context in which the techniques may be performed comprises an audio ecosystem that may include broadcast recording audio objects, professional audio systems, consumer on-device capture, HOA audio format, on-device rendering, consumer audio, TV, and accessories, and car audio systems.

The broadcast recording audio objects, the professional audio systems, and the consumer on-device capture may all code their output using HOA audio format. In this way, the audio content may be coded using the HOA audio format into a single representation that may be played back using the on-device rendering, the consumer audio, TV, and accessories, and the car audio systems. In other words, the single representation of the audio content may be played back at a generic audio playback system (i.e., as opposed to requiring a particular configuration such as 5.1, 7.1, etc.), such as audio playback system 16.

Other examples of context in which the techniques may be performed include an audio ecosystem that may include acquisition elements, and playback elements. The acquisition elements may include wired and/or wireless acquisition devices (e.g., microphones), on-device surround sound capture, and mobile devices (e.g., smartphones and tablets). In some examples, wired and/or wireless acquisition devices may be coupled to mobile device via wired and/or wireless communication channel(s).

In accordance with one or more techniques of this disclosure, the mobile device may be used to acquire a soundfield. For instance, the mobile device may acquire a soundfield via the wired and/or wireless acquisition devices and/or the on-device surround sound capture (e.g., a plurality of microphones integrated into the mobile device). The mobile device may then code the acquired soundfield into various representations for playback by one or more of the playback elements. For instance, a user of the mobile device may record (acquire a soundfield of) a live event (e.g., a meeting, a conference, a play, a concert, etc.), and code the recording into various representation, including higher order ambisonic HOA representations.

The mobile device may also utilize one or more of the playback elements to playback the coded soundfield. For instance, the mobile device may decode the coded soundfield and output a signal to one or more of the playback elements that causes the one or more of the playback elements to recreate the soundfield. As one example, the mobile device may utilize the wireless and/or wireless communication channels to output the signal to one or more speakers (e.g., speaker arrays, sound bars, etc.). As another example, the mobile device may utilize docking solutions to output the signal to one or more docking stations and/or one or more docked speakers (e.g., sound systems in smart cars and/or homes). As another example, the mobile device may utilize headphone rendering to output the signal to a headset or headphones, e.g., to create realistic binaural sound.

In some examples, a particular mobile device may both acquire a soundfield and playback the same soundfield at a later time. In some examples, the mobile device may acquire a soundfield, encode the soundfield, and transmit the encoded soundfield to one or more other devices (e.g., other mobile devices and/or other non-mobile devices) for playback.

Yet another context in which the techniques may be performed includes an audio ecosystem that may include audio content, game studios, coded audio content, rendering engines, and delivery systems. In some examples, the game studios may include one or more DAWs which may support editing of audio signals. For instance, the one or more DAWs may include audio plugins and/or tools which may be configured to operate with (e.g., work with) one or more game audio systems. In some examples, the game studios may output new stem formats that support audio format. In any case, the game studios may output coded audio content to the rendering engines which may render a soundfield for playback by the delivery systems.

The mobile device may also, in some instances, include a plurality of microphones that are collectively configured to record a soundfield, including 3D soundfields. In other words, the plurality of microphones may have X, Y, Z diversity. In some examples, the mobile device may include a microphone which may be rotated to provide X, Y, Z diversity with respect to one or more other microphones of the mobile device.

A ruggedized video capture device may further be configured to record a soundfield. In some examples, the ruggedized video capture device may be attached to a helmet of a user engaged in an activity. For instance, the ruggedized video capture device may be attached to a helmet of a user whitewater rafting. In this way, the ruggedized video capture device may capture a soundfield that represents the action all around the user (e.g., water crashing behind the user, another rafter speaking in front of the user, etc.).

The techniques may also be performed with respect to an accessory enhanced mobile device, which may be configured to record a soundfield, including a 3D soundfield. In some examples, the mobile device may be similar to the mobile devices discussed above, with the addition of one or more accessories. For instance, a microphone, including an Eigen microphone, may be attached to the above noted mobile device to form an accessory enhanced mobile device. In this way, the accessory enhanced mobile device may capture a higher quality version of the soundfield than just using sound capture components integral to the accessory enhanced mobile device.

Example audio playback devices that may perform various aspects of the techniques described in this disclosure are further discussed below. In accordance with one or more techniques of this disclosure, speakers and/or sound bars may be arranged in any arbitrary configuration while still playing back a soundfield, including a 3D soundfield. Moreover, in some examples, headphone playback devices may be coupled to a decoder via either a wired or a wireless connection. In accordance with one or more techniques of this disclosure, a single generic representation of a soundfield may be utilized to render the soundfield on any combination of the speakers, the sound bars, and the headphone playback devices.

A number of different example audio playback environments may also be suitable for performing various aspects of the techniques described in this disclosure. For instance, a 5.1 speaker playback environment, a 2.0 (e.g., stereo) speaker playback environment, a 9.1 speaker playback environment with full height front loudspeakers, a 22.2 speaker playback environment, a 16.0 speaker playback environment, an automotive speaker playback environment, and a mobile device with ear bud playback environment may be suitable environments for performing various aspects of the techniques described in this disclosure.

In accordance with one or more techniques of this disclosure, a single generic representation of a soundfield may be utilized to render the soundfield on any of the foregoing playback environments. Additionally, the techniques of this disclosure enable a rendered to render a soundfield from a generic representation for playback on the playback environments other than that described above. For instance, if design considerations prohibit proper placement of speakers according to a 7.1 speaker playback environment (e.g., if it is not possible to place a right surround speaker), the techniques of this disclosure enable a render to compensate with the other 6 speakers such that playback may be achieved on a 6.1 speaker playback environment.

Moreover, a user may watch a sports game while wearing headphones. In accordance with one or more techniques of this disclosure, the soundfield, including 3D soundfields, of the sports game may be acquired (e.g., one or more microphones and/or Eigen microphones may be placed in and/or around the baseball stadium). HOA coefficients corresponding to the 3D soundfield may be obtained and transmitted to a decoder, the decoder may reconstruct the 3D soundfield based on the HOA coefficients and output the reconstructed 3D soundfield to a renderer, the renderer may obtain an indication as to the type of playback environment (e.g., headphones), and render the reconstructed 3D soundfield into signals that cause the headphones to output a representation of the 3D soundfield of the sports game.

In each of the various instances described above, it should be understood that the source device 12 may perform a method or otherwise comprise means to perform each step of the method for which the source device 12 is described above as performing. In some instances, the means may comprise one or more processors. In some instances, the one or more processors may represent a special purpose processor configured by way of instructions stored to a non-transitory computer-readable storage medium. In other words, various aspects of the techniques in each of the sets of encoding examples may provide for a non-transitory computer-readable storage medium having stored thereon instructions that, when executed, cause the one or more processors to perform the method for which the source device 12 has been configured to perform.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media. Data storage media may be any available media that can be accessed by one or more computers or one or more processors to retrieve instructions, code and/or data structures for implementation of the techniques described in this disclosure. A computer program product may include a computer-readable medium.

Likewise, in each of the various instances described above, it should be understood that the sink device 14 may perform a method or otherwise comprise means to perform each step of the method for which the sink device 14 is configured to perform. In some instances, the means may comprise one or more processors. In some instances, the one or more processors may represent a special purpose processor configured by way of instructions stored to a non-transitory computer-readable storage medium. In other words, various aspects of the techniques in each of the sets of encoding examples may provide for a non-transitory computer-readable storage medium having stored thereon instructions that, when executed, cause the one or more processors to perform the method for which the sink device 14 has been configured to perform.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry, including fixed or programmble processing circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various aspects of the techniques have been described. These and other aspects of the techniques are within the scope of the following claims.

The invention claimed is:

1. A source device configured to stream a first audio data and a second audio data from the source device to a sink device, the source device comprising:
a memory configured to store at least a portion of the first audio data; and
one or more processors coupled to the memory, and configured to:
execute a first application that outputs the first audio data and a request for a first quality of service concerning audio processing applied to the first audio data;
executing the first application, and in response configure a wireless audio processing path to achieve the requested first quality of service;
process, by the wireless audio processing path, the first audio data to obtain a first bitstream representative of the first audio data;
output the first bitstream in accordance with a wireless communication protocol in a wireless session;
execute a second application that outputs the second audio data, and requests for a second quality of service concerning audio processing applied to the second audio data;
select one of the first quality of service or the second quality of service that requests a lowest relative latency;
reconfigure the wireless audio processing path to achieve the selected one of the first quality of service or the second quality of service;
mix the first audio data output by the first application with the second audio data output by the second application to obtain mixed audio data;
process, by the reconfigured wireless audio processing path, the mixed audio data to obtain a second bitstream representative of the mixed audio data; and
output the second bitstream based on the reconfigured wireless audio processing path in accordance with the wireless communication protocol in the same wireless session.

2. The source device of claim 1, wherein the wireless communication protocol comprises a personal area network wireless communication protocol.

3. The source device of claim 2, wherein the personal area network wireless communication protocol comprises a Bluetooth® wireless communication protocol.

4. The source device of claim 2, wherein the personal area network wireless communication protocol comprises a Bluetooth® wireless communication protocol operating according to the advanced audio distribution profile.

5. The source device of claim 1,
wherein the wireless audio processing path includes an audio encoder integrated with the one or more processors, and
wherein the one or more processors are configured to:
process, by the reconfigured wireless audio processing path, comprises an adjustment of a compression ratio of the audio encoder, such that the audio encoder is configured to perform audio encoding with respect to the mixed audio data to obtain encoded audio data that increases the compression ratio relative to the compression ratio prior to the adjustment.

6. The source device of claim 1, wherein the one or more processors are configured to process, by the reconfigured wireless audio processing path, comprises an adjustment to an amount of memory dedicated to buffering during the audio processing by the wireless audio processing path,
wherein the one or more processors are configured to store a different number of packets in the memory after the adjustment as compared to the number of packets in the memory prior to the adjustment.

7. The source device of claim 1,
wherein the wireless communication protocol comprises one of a plurality of wireless communication protocols,
wherein the one or more processors are configured to adjust a coexistence scheme by which a transceiver transmits the second bitstream based on what a user is doing with either the first application or the second application associated with the selected quality of service, the coexistence scheme indicating when data associated with each of the plurality of wireless communication protocols is sent.

8. The source device of claim 7, wherein at least two of the plurality of wireless communication protocols used in the same wireless session coexist within a same portion of a spectrum.

9. The source device of claim 8, wherein the same portion of the spectrum is 2.4 Gigahertz (GHz) or adjacent portions of the spectrum around 2.4 GHz.

10. The source device of claim 1, further comprising a transceiver configured to transmit the second bitstream based on the reconfigured wireless audio processing to the sink device in accordance with the wireless communication protocol in the same wireless session.

11. The source device of claim 10, wherein the transceiver is further configured to transmit an indication of the selected quality of service to the sink device.

12. The source device of claim 1,
wherein the one or more processors are further configured to:
obtain a plurality of compression ratios based on a bitrate of a wireless connection over which the second bitstream is to be sent to the sink device, the wireless connection allowing transmission of packets of the second bitstream at regular intervals; and
selecting a compression ratio from the plurality of compression ratios that reduces latency associated with the audio processing applied to the mixed audio data and transmission of the packet, as part of the processing, by the reconfigured wireless audio processing path, the mixed audio data to obtain the bitstream representative of the mixed audio data.

13. The source device of claim 1, wherein the one or more processors are reconfigured to adjust one or more of: a thread priority associated with the wireless audio processing path, a scheduling period allocated to the wireless audio processing path, and a link management function associated with the wireless audio processing path.

14. The source device of claim 1, wherein the one or more processors are configured to adjust a wake up time associated with the wireless audio processing path.

15. The source device of claim 1, wherein the one or more processors are configured to adjust a battery usage allocated to the wireless audio processing path.

16. The source device of claim 1, wherein the one or more processors are configured to perform an adjustment of a compression ratio of an audio encoder, such that the audio encoder performs audio encoding with respect to the audio data to obtain encoded audio data that increases the compression ratio relative to the compression ratio prior to the adjustment.

17. The source device of claim 1, wherein the second application is an application-in-focus that a user is currently interacting with, and wherein the one or more processors are configured to determine whether the source device is currently displaying the application-in-focus.

18. The device of claim 1, wherein the one or more processors are configured to determine whether the source device is currently displaying an application-in-focus, and wherein the application-in-focus is the second application and not the first application.

19. A method of streaming a first audio data and a second audio data from a source device to a sink device, the method comprising:
  executing a first application that outputs the first audio data and a request for a first quality of service concerning audio processing applied to the first audio data;
  configuring, responsive to the determination that the source device is currently executing the first application, a wireless audio processing path to achieve the requested first quality of service;
  processing, by the wireless audio processing path, the first audio data to obtain a first bitstream representative of the first audio data;
  transmitting the first bitstream to the sink device in accordance with a wireless communication protocol in a wireless session;
  execution of a second application that outputs the second audio data, and requests for a second quality of service concerning audio processing applied to the second audio data;
  selecting one of the first quality of service or the second quality of service that requests a lowest relative latency;
  reconfiguring the wireless audio processing path to achieve the selected one of the first quality of service or the second quality of service;
  mixing the first audio data output by the first application with the second audio data output by the second application to obtain mixed audio data;
  processing, by the reconfigured wireless audio processing path, the mixed audio data to obtain a second bitstream representative of the mixed audio data; and
  transmitting the second bitstream to the sink device in accordance with the wireless communication protocol in the same wireless session.

20. The method of claim 19, wherein the wireless communication protocol comprises a personal area network wireless communication protocol.

21. The method of claim 20, wherein the personal area network wireless communication protocol comprises a Bluetooth® wireless communication protocol.

22. The method of claim 20, wherein the personal area network wireless communication protocol comprises a Bluetooth® wireless communication protocol operating according to the advanced audio distribution profile.

23. The method of claim 19, wherein the wireless audio processing path includes an audio encoder, and wherein the processing, by the reconfigured wireless audio processing path, comprises adjusting a compression ratio of the audio encoder, such that the audio encoder performs audio encoding with respect to the mixed audio data to obtain encoded audio data that increases the compression ratio relative to the compression ratio prior to the adjusting.

24. The method of claim 23, wherein the audio encoder is part of an aptX audio codec.

25. The method of claim 19, wherein the processing, by the reconfigured wireless audio processing path, comprises adjusting an amount of memory dedicated to buffering during the audio processing by the reconfigured wireless audio processing path, storing a different number of packets in the memory after the adjusting as compared to the number of packets in the memory prior to the adjusting.

26. The method of claim 19,
  wherein the wireless communication protocol comprises one of a plurality of wireless communication protocols, and
  wherein reconfiguring the wireless audio processing path comprises adjusting a coexistence scheme by which the transceiver transmits the second bitstream based on what a user is doing on either the first application or the second application associated with the selected quality of service, the coexistence scheme indicates when data associated with each of the plurality of wireless communication protocols is sent.

27. The method of claim 26, wherein at least two of the plurality of wireless communication protocols coexist within a same portion of a spectrum.

28. The method of claim 19,
  wherein an application with which a user is currently interacting is an application-in-focus and determining whether the source device is currently displaying the application-in-focus, and wherein the application-in-focus is the second application and not the first application.

29. The method of claim 19, further comprising:
  obtaining a plurality of compression ratios based on a bitrate of a wireless connection over which the second bitstream is sent to the sink device, the wireless connection allowing transmission of packets of the bitstream at regular intervals; and
  selecting a compression ratio from the plurality of compression ratios that reduces latency associated with the audio processing applied to the mixed audio data and transmission of the packets, as part of the processing, by the reconfigured wireless audio processing path, the mixed audio data to obtain the second bitstream representative of the mixed audio data.

30. The method of claim 19, wherein reconfiguring the wireless audio processing path comprises adjusting one or more of: a thread priority associated with the wireless audio processing path, a scheduling period allocated to the wireless audio processing path, and a link management function associated with the wireless audio processing path.

31. The method of claim 19, wherein reconfiguring the wireless audio processing path comprises adjusting a wake up time associated with the wireless audio processing path.

32. The method of claim 19, wherein reconfiguring the wireless audio processing path comprises adjusting a battery usage allocated to the wireless audio processing path.

33. A non-transitory computer-readable medium having stored thereon instructions that, when executed, cause one or more processors of a source device to:
  execute a first application that outputs a first audio data and a request for a first quality of service concerning audio processing applied to the first audio data;
  determine that the source device is currently executing the first application, and in response configure a wireless audio processing path to achieve the requested first quality of service;
  process, by the wireless audio processing path, the first audio data to obtain a bitstream representative of the first audio data;
  output the first bitstream in accordance with a wireless communication protocol in a wireless session;

execute a second application that outputs a second audio data, and requests for a second quality of service concerning audio processing applied to the second audio data;

select one of the first quality of service or the second quality of service that requests a lowest relative latency;

reconfigure the wireless audio processing path to achieve the selected one of the first quality of service or the second quality of service;

mix the first audio data output by the first application with the second audio data output by the second application to obtain mixed audio data;

process, by the reconfigured wireless audio processing path, the mixed audio data to obtain the second bitstream representative of the mixed audio data; and output the second bitstream based on the reconfigured wireless audio processing path in accordance with the wireless communication protocol in the same wireless session;

process, by the reconfigured wireless audio processing path, the mixed audio data to obtain a second bitstream representative of the mixed audio data; and output the second bitstream based on the reconfigured wireless audio processing path in accordance with the wireless communication protocol in the same wireless session.

* * * * *